US011233291B2

(12) United States Patent
Confer et al.

(10) Patent No.: US 11,233,291 B2
(45) Date of Patent: Jan. 25, 2022

(54) SYSTEMS AND METHODS FOR A MODULAR BATTERY SYSTEM

(71) Applicant: The Raymond Corporation, Greene, NY (US)

(72) Inventors: Thomas W. Confer, Chenango Forks, NY (US); David B. Howe, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 130 days.

(21) Appl. No.: 16/828,232

(22) Filed: Mar. 24, 2020

(65) Prior Publication Data

US 2020/0321569 A1 Oct. 8, 2020

Related U.S. Application Data

(60) Provisional application No. 62/828,777, filed on Apr. 3, 2019.

(51) Int. Cl.
*H01M 50/244* (2021.01)
*H01M 50/249* (2021.01)
*H01M 50/258* (2021.01)
*H01M 50/262* (2021.01)
*B60L 50/64* (2019.01)

(52) U.S. Cl.
CPC ....... *H01M 50/244* (2021.01); *H01M 50/249* (2021.01); *H01M 50/258* (2021.01); *H01M 50/262* (2021.01); *B60L 50/64* (2019.02); *H01M 2220/20* (2013.01)

(58) Field of Classification Search
None
See application file for complete search history.

(56) References Cited

U.S. PATENT DOCUMENTS

| | | | |
|---|---|---|---|
| 7,712,563 B2 | 5/2010 | Niebuhr | |
| 8,852,794 B2 | 10/2014 | Laitinen | |
| 9,511,984 B2 | 12/2016 | Sakai | |
| 9,583,749 B2 | 2/2017 | Okuyama | |
| 9,827,840 B2 | 11/2017 | Wen | |
| 9,908,431 B2 | 3/2018 | Kirk | |
| 10,003,050 B2 | 6/2018 | Morisaku | |
| 2005/0092536 A1* | 5/2005 | Takeda | B60L 50/60 180/68.5 |

(Continued)

FOREIGN PATENT DOCUMENTS

| | | | | |
|---|---|---|---|---|
| CN | 106229431 A | 12/2016 | | |
| DE | 102005051058 A1 * | 4/2007 | | B66F 9/0754 |

(Continued)

*Primary Examiner* — Gregg Cantelmo
(74) *Attorney, Agent, or Firm* — Quarles & Brady LLP

(57) ABSTRACT

A modular battery system for a material handling vehicle is provided. The modular battery system includes a counterweight assembly, a battery assembly enclosing a power source and including a battery base, and a pair of channels removably coupled to the battery base and laterally separated from one another to define a counterweight slot therebetween. The battery assembly is configured to be slidably installed onto the counterweight assembly with the counterweight assembly received within the counterweight slot defined between the pair of channels.

20 Claims, 20 Drawing Sheets

(56) References Cited

U.S. PATENT DOCUMENTS

| | | |
|---|---|---|
| 2009/0283346 A1 | 11/2009 | Katae |
| 2015/0239719 A1* | 8/2015 | Oishi ............... H01M 10/6551 |
| | | 180/68.5 |
| 2019/0103639 A1 | 4/2019 | Guglielmo |

FOREIGN PATENT DOCUMENTS

| | | | |
|---|---|---|---|
| EP | 1925588 A2 * | 5/2008 | ............... B60K 1/04 |
| EP | 1925588 A2 | 5/2008 | |
| EP | 3608990 A1 | 2/2020 | |
| JP | 11208287 A * | 8/1999 | ............... B60L 50/16 |

* cited by examiner

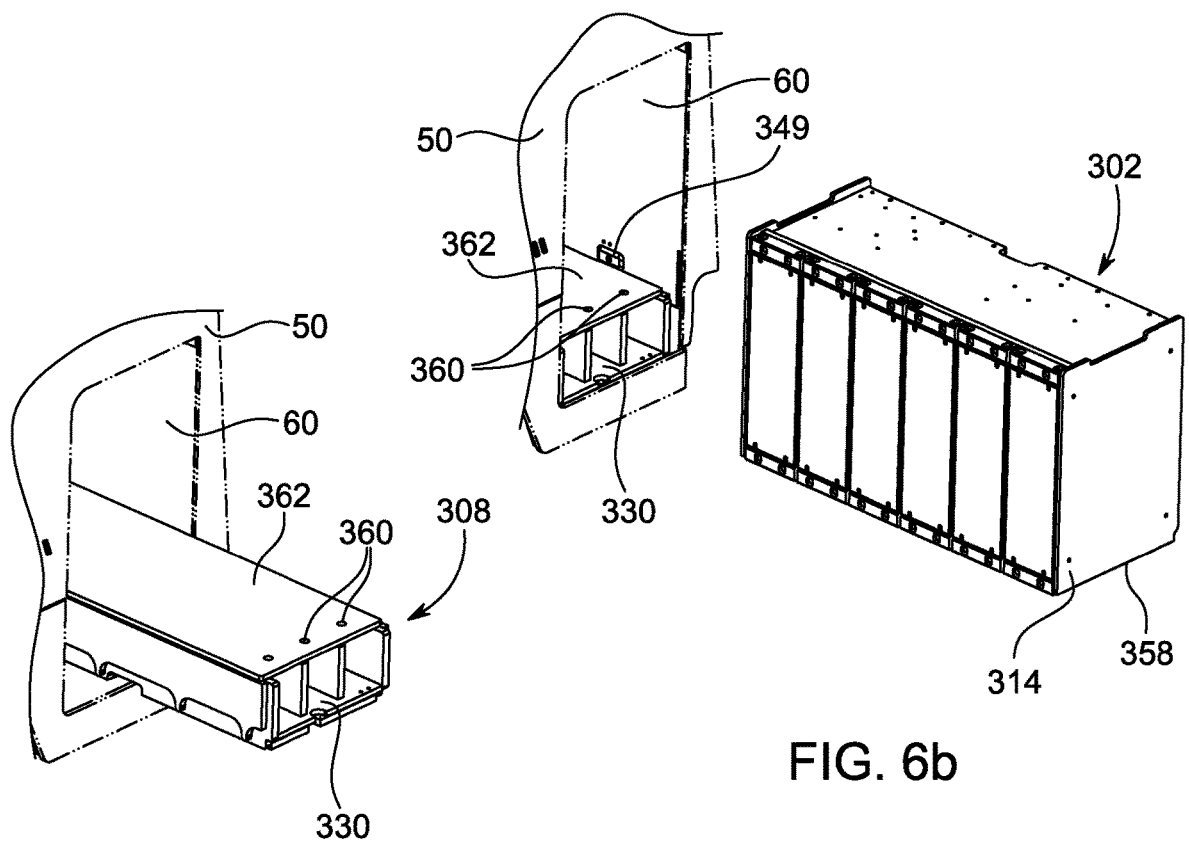
FIG. 6a
FIG. 6b
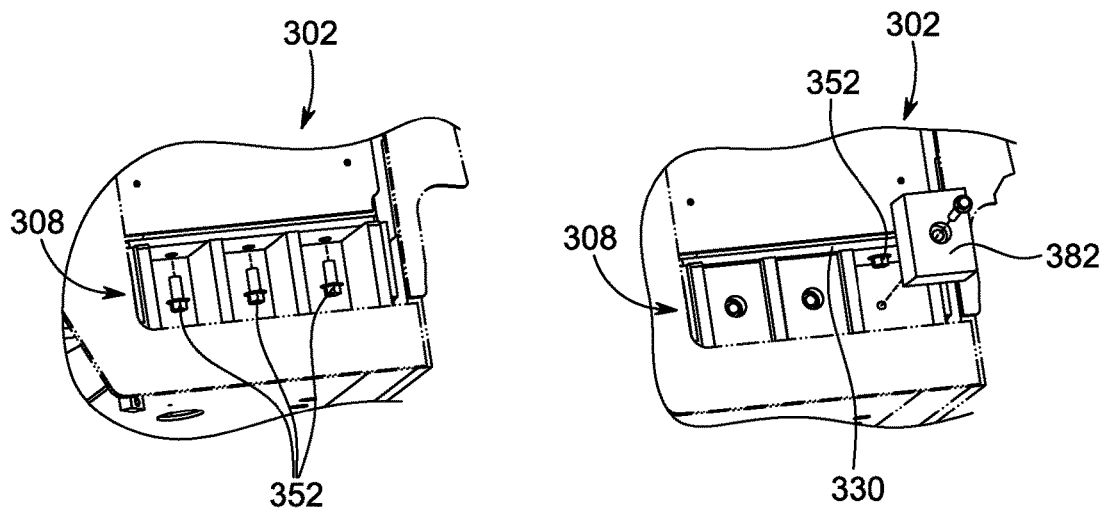
FIG. 6c
FIG. 6d

SYSTEMS AND METHODS FOR A MODULAR BATTERY SYSTEM

CROSS-REFERENCE TO RELATED APPLICATIONS

The present application is based on and claims priority to U.S. Provisional Patent Application No. 62/828,777, filed on Apr. 3, 2019, and entitled "Systems and Methods for a Modular Battery System." The entire disclosure of which is incorporated herein by reference in its entirety.

STATEMENT CONCERNING FEDERALLY SPONSORED RESEARCH

Not applicable.

BACKGROUND

Material handling vehicles may be designed in a variety of configurations to perform a variety of tasks. These types of vehicles are commonly used in a warehouse or a factory to transport, store, and/or retrieve materials and finished goods.

In warehousing operations, material quantities and inventory turnover rates are increasing rapidly. Therefore, to maintain competitiveness, it is important for warehousing operations to ensure that each piece of equipment is productive. Material handling vehicles typically require physically large batteries in order to provide power to the vehicle for extended periods of time.

BRIEF SUMMARY

The present invention relates to the field of material handling vehicles, and more specifically to battery systems for material handling vehicles.

In one aspect, the present disclosure provides a modular battery system for a material handling vehicle can include a battery assembly having a power source and a battery base coupled to the battery base. The modular battery system can further include a counterweight assembly with a counterweight base. The counterweight base can be configured to slidably receive the battery base. The battery base can further be configured to be removably secured to the counterweight base.

In one aspect, the present disclosure provides a material handling vehicle can include a vehicle body with a battery compartment, a battery assembly dimensioned to be received within the battery compartment, and a counterweight assembly configured to be positioned within with the battery compartment. The battery assembly can including an energy source for powering the material handling vehicle, and the counterweight assembly can be configured to slidably receive the battery assembly, thereby coupling the battery assembly to the vehicle body.

In one aspect, the present disclosure provides a method of coupling a battery and counterweight to a material handling vehicle can include the steps of engaging a vehicle body of the material handling vehicle with at least one mounting feature on a counterweight assembly, receiving a battery assembly on the counterweight assembly, and coupling the battery assembly to the counterweight assembly with a retention system, thereby coupling the battery assembly to the material handling vehicle.

In one aspect, the present disclosure provides a modular battery system for a material handling vehicle with a battery compartment can include a counterweight assembly including a counterweight; a battery assembly configured to be removably secured to the counterweight assembly, the battery assembly including a power source and a battery base having at least one base opening arranged in standardized pattern; and the battery assembly can be configured to be slidably received into the battery compartment.

In one aspect, the present disclosure provides a method of securing a battery assembly to a counterweight assembly, with the battery assembly including a plurality of base openings arranged in a standardized array, can include the steps of disengaging a fastener from a first mounting structure and the battery assembly; aligning at least one mounting structure opening formed in a second mounting feature with at least one base opening in the plurality of base openings arranged in a standardized array; engaging the at least one mounting structure opening and the at least one base opening with the fastener to secure the mounting structure to the battery assembly; and receiving the battery assembly on the counterweight assembly to secure the battery assembly to the counterweight assembly.

In one aspect, the present disclosure provides a modular battery system for a material handling vehicle. The modular battery system includes a counterweight assembly, a battery assembly enclosing a power source and including a battery base, and a pair of channels removably coupled to the battery base and laterally separated from one another to define a counterweight slot therebetween. The battery assembly is configured to be slidably installed onto the counterweight assembly with the counterweight assembly received within the counterweight slot defined between the pair of channels.

In one aspect, the present disclosure provides a modular battery system for a material handling vehicle. The modular battery system includes a counterweight assembly, a battery assembly enclosing a power source and including a battery base, and a pair of channels removably coupled to the battery base and each having at least one spacer attached to a laterally-outer surface thereof. The battery assembly is configured to be slidably installed onto the counterweight assembly. Each of the at least one spacers is configured to add additional counterweight to the battery assembly.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

FIG. 2b is a perspective view of the battery assembly of FIG. 1b being installed onto the counterweight assembly of FIG. 1a within the material handling vehicle of FIG. 2a.

FIG. 4b is a perspective view of the battery assembly of FIG. 3b being installed onto the counterweight assembly of FIG. 3b within the material handling vehicle of FIG. 4a.

FIG. 6a is a perspective view of the counterweight assembly of FIG. 5a being installed within a material handling vehicle.

FIG. 6b is a perspective view of the battery assembly of FIG. 5b being installed onto the counterweight assembly within the material handling vehicle of FIG. 6a.

FIG. 6c is a perspective view of the battery assembly, the counterweight assembly, and the material handling vehicle of FIG. 6b, with a plurality of retention pins coupling the battery assembly to the counterweight assembly.

FIG. 6d is a perspective view of the battery assembly, the counterweight assembly, the material handling vehicle, and the retention pins of FIG. 6c, with a plurality of filler plates retaining the retention pins.

FIG. 8b is a perspective view of the battery assembly of FIG. 7c being installed onto the counterweight assembly counter weight assembly of FIG. 7a within material handling vehicle of FIG. 8a.

FIG. 10b is a perspective view of the battery assembly of FIG. 9b being installed onto the counterweight assembly of FIG. 9a within material handling vehicle of FIG. 10a.

FIG. 11b is a perspective view of the filler plate of FIG. 9c installed onto the battery assembly and the counterweight assembly FIG. 11a.

DETAILED DESCRIPTION

Figure 1A:
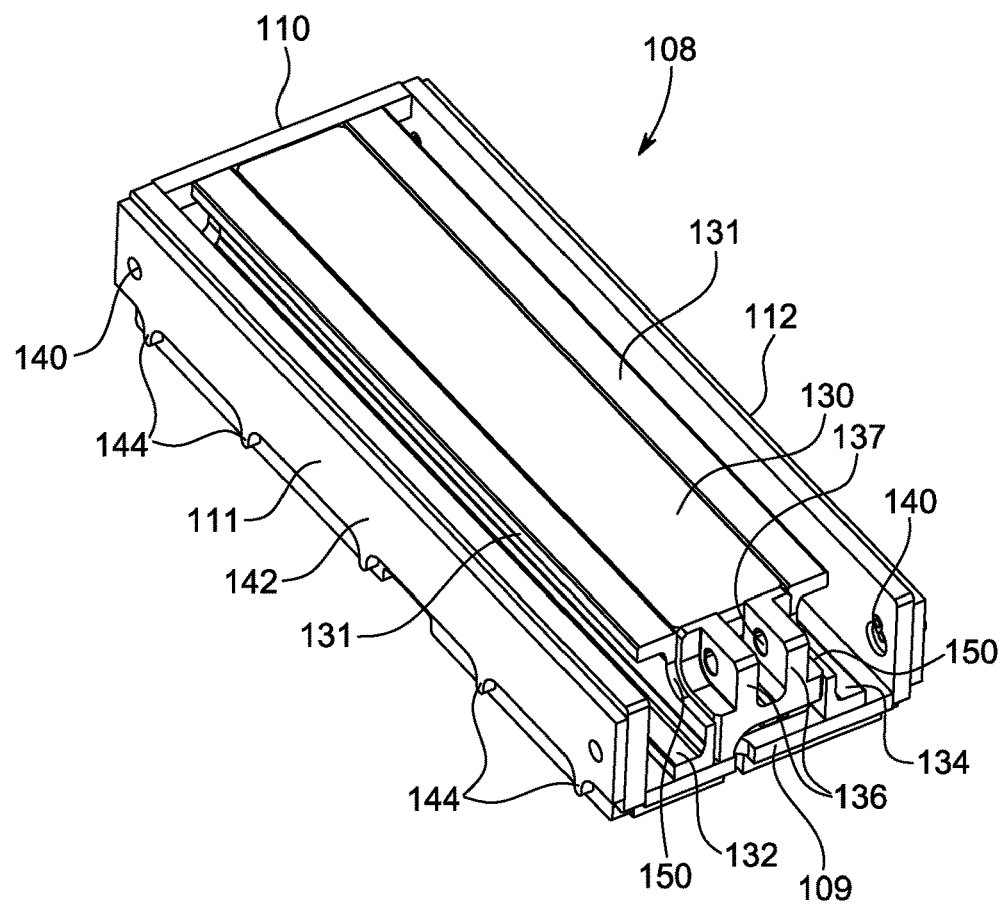
FIG. 1a is a perspective view of a counterweight assembly according to one aspect of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular non-limiting example and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular non-limiting example may generally apply to alternative orientations of that non-limiting example. For example, "front" and "rear" directions or features (or "right" and "left" directions or features, and so on) may be generally understood to indicate relatively opposite directions or features.

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

In some material handling vehicles, lead-acid batteries are used as a power source. In addition to powering the material handling vehicle, lead-acid batteries can also serve as a counterweight to counterbalance the load carried by the vehicle. Lithium-ion batteries are also commonly used to power material handling vehicles. Material handling vehicles using lithium-ion batteries can include additional weights, often in the form of metal plates, in order to function as a counterweight.

Disclosed herein is a modular battery system including a detachable counterweight assembly and a detachable battery assembly. Non-limiting examples of the modular battery system illustrated in the figures are configured to for use with a material handling vehicle which has a vehicle body and a battery compartment. In other non-limiting examples, however, it should be appreciated that a modular battery system can be configured for use with other material handling vehicles which do not include a battery compartment and which may include additional features not described herein. In still other non-limiting examples, a modular battery system could be used with alternate types of industrial or consumer vehicles.

Referring now to FIGS. 1a-2d, a non-limiting example of a modular battery system 100 configured for use with a material handling vehicle 50 is shown. The modular battery system 100 can include a battery assembly 102 and a counterweight assembly 108 configured to be removably secured to the battery assembly 102. The material handling vehicle 50 can include a battery compartment 60 dimensioned so that the battery assembly 102 and the counterweight assembly 108 can simultaneously fit therein.

The battery assembly 102 can define a battery assembly front side 103, a battery assembly back side 104, a battery assembly left side 105, and a battery assembly right side 106, and can include a battery base 114 and a battery enclosure 116. The battery enclosure 116 can include an enclosure frame 118 configured to house at least one power source 120 in such a way that each power source 120 is removably secured within the battery enclosure 116, e.g., to the battery base 114. Alternatively, in some non-limiting examples, the power sources 120 can be coupled directly to the battery base 114 without inclusion of a battery enclosure 116.

Figure 1B:
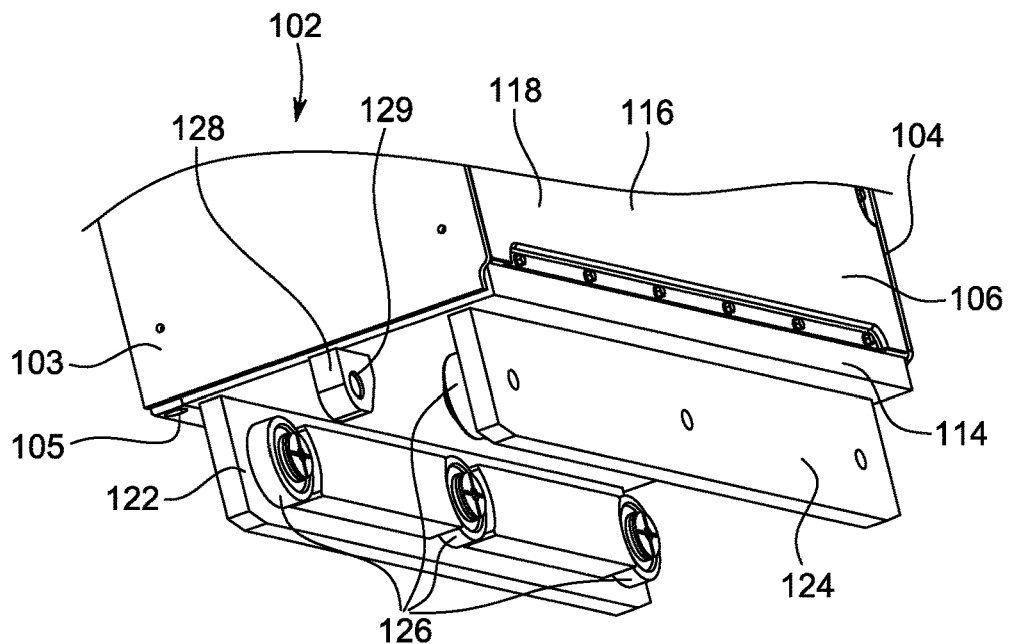
FIG. 1b is a perspective view of a battery assembly according to one aspect of the present disclosure.

Referring to FIG. 1b, the battery assembly 102 can further include a left positioning portion 122 and a right positioning portion 124 which are coupled to and extend downwardly from the battery base 114 between the battery assembly front and back sides 103, 104. The left and right positioning portions 122, 124 can further be positioned proximate the battery assembly left and right sides 105, 106, respectively, and may be oriented so that they are parallel to the battery assembly left and right sides 105, 106. In some non-limiting examples, multiple individual sections of positioning features may be used in place of at least one of the left positioning portion 122 and the right positioning portion 124. A battery bracket 128 defining a battery bracket opening 129 can be coupled to the battery base 114 proximate the battery assembly front side 103, and may be positioned between the left and right positioning portions 122, 124.

The battery assembly 102 can also include a plurality of roller bearings 126 which are rotatably coupled to at least one of the left positioning portion 122 and the right positioning portion 124, each roller bearing 126 optionally including an adjustable shimming puck (not shown). The roller bearings 126 can be spaced along the lengths of the positioning portions 122, 124 and are configured to provide a rolling interface between the battery assembly 102 and the counterweight assembly 108.

It should be appreciated that, in some non-limiting examples, at least one of the battery enclosure 116, the left positioning portion 122, the right positioning portion 124, and the battery bracket 128 may be integrally formed in the battery base 114. Additionally, the connections between at least one of the battery base 114, battery enclosure 116, the left positioning portion 122, the right positioning portion 124, the battery bracket 128, and the roller bearings 126 may vary. For example, at least one of the left positioning portion 122 and the right positioning portion 124 may be coupled directly to the battery enclosure 116 or to the power source 120, and the roller bearings 126 may be coupled directly to the battery base 114.

Referring now to FIG. 1a, the counterweight assembly 108 can define a counterweight assembly front side 109, a counterweight assembly back side 110, a counterweight assembly left side 111, and a counterweight assembly right side 112, and can include a counterweight base 130. The counterweight base 130 can include a left channel 132 and a right channel 134 formed in the counterweight base 130 between the counterweight assembly front and back sides 109, 110 and positioned proximate and parallel to the counterweight assembly left and right sides 111, 112, respectively. The counterweight base 130 can further include at least one counterweight bracket 136 defining a counterweight bracket opening 137, and at least one mounting opening 140 formed in the counterweight base 130. The counterweight assembly 108 can also include at least one counterweight mounting feature 142 protruding outwardly from the counterweight base 130, and the mounting feature 142 may include at least one ridge 144. In the illustrated non-limiting example, a mounting feature 142 extends outwardly from each of the counterweight assembly left and right sides 111, 112, and each mounting feature 142 includes five ridges 144 spaced along the mounting feature 142 between the counterweight assembly front and back sides 109, 110. In other non-limiting examples, the quantity and configuration of the mounting features 142 and ridges 144 may vary.

It should be appreciated that at least one of the left channel 132, the right channel 134, the counterweight bracket 136, and the mounting features 142 can be integrally formed in the counterweight base 130 or can be a separate component which is coupled to the counterweight base 130. Similarly, in some non-limiting examples the mounting opening 140 may be formed in a separate part coupled to the battery base 114. The mounting features 142 may include alternatively shaped projections in place of the ridges 144. For example, cylindrical features (not shown) may be used in some non-limiting examples.

Looking to FIGS. 2a-2d, the material handling vehicle 50 can include at least one slot (not shown) formed within the battery compartment 60. Each slot corresponds to one of the ridges 144 of the counterweight assembly 108 and is configured to engage the corresponding ridge 144. While at least one slot is engaged with a ridge 144, relative motion between the counterweight assembly 108 and the material handling vehicle 50 is restricted so that the counterweight assembly 108 is retained in the battery compartment 60. The battery compartment 60 can further include at least one compartment opening (not shown), wherein each of the compartment openings corresponds to a mounting opening 140. The compartment openings can further be configured so that, when the ridges 144 are engaged with the slots, the mounting openings 140 are concentric with the compartment openings. This can enable a mounting pin 148 to be inserted into the mounting opening 140 and the compartment opening simultaneously, thereby coupling the counterweight assembly 108 to the material handling vehicle 50. In some non-limiting examples, a bolt or another fastener may be used to secure the counterweight assembly 108 to the material handling vehicle 50.

Referring back to the counterweight assembly 108 of FIG. 1a, each of the channels 132, 134 can each include an entry notch 150 proximate the counterweight assembly front side 109, and can further be configured so that the left channel 132 and the right channel 134 can receive the roller bearings 126 coupled to the left positioning portion 122 and the right positioning portion 124, respectively, through the entry notches 150. The channels 132, 134 may restrict lateral motion of the roller bearings 126 to the left or to the right, and an upper portion 131 of each of the channels 132, 134 restricts vertical motion of the roller bearings 126. The roller bearings 126 of the battery assembly 102 can roll along a lower portion of each of the channels 132, 134 so that the battery assembly 102 moves towards the counterweight assembly back side 110 and so that additional roller bearings 126 enter the channels 132, 134 through the entry notches 150, and may continue rolling until at least one rolling bearing 126 abuts the counterweight assembly back side 110 at the end of the channels 132, 134. When the battery assembly 102 is fully received by the counterweight assembly 108, the battery bracket 128 and the counterweight bracket 136 may be positioned so that the battery bracket opening 129 and the counterweight bracket opening 137 are concentric with each other. A retention pin 152 can be inserted through the battery bracket opening 129 and the counterweight bracket opening 137, thereby coupling the battery assembly 102 to the counterweight assembly 108. In some non-limiting examples, a retainer ring 153 can be attached to the retention pin 152 to further retain the retention pin 152 in the battery bracket opening 129 and the counterweight bracket opening 137.

Figure 2A:
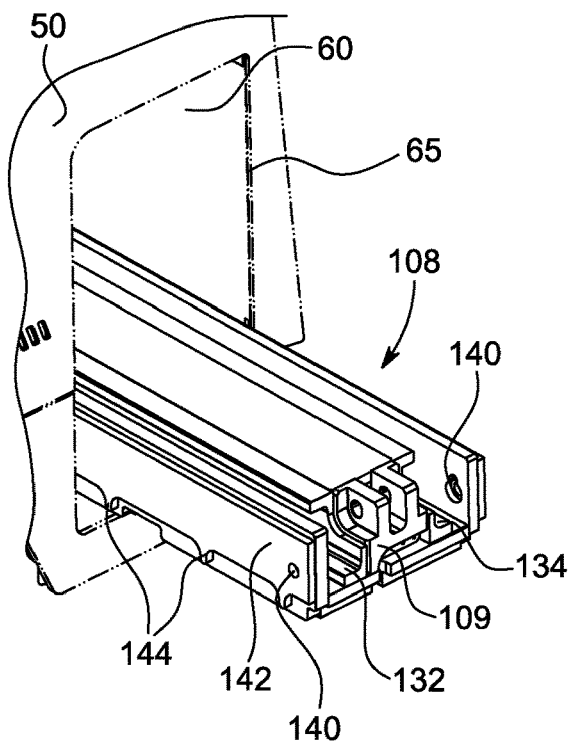
FIG. 2a is a perspective view of the counterweight assembly of FIG. 1a being installed within a material handling vehicle.
Figure 2B:
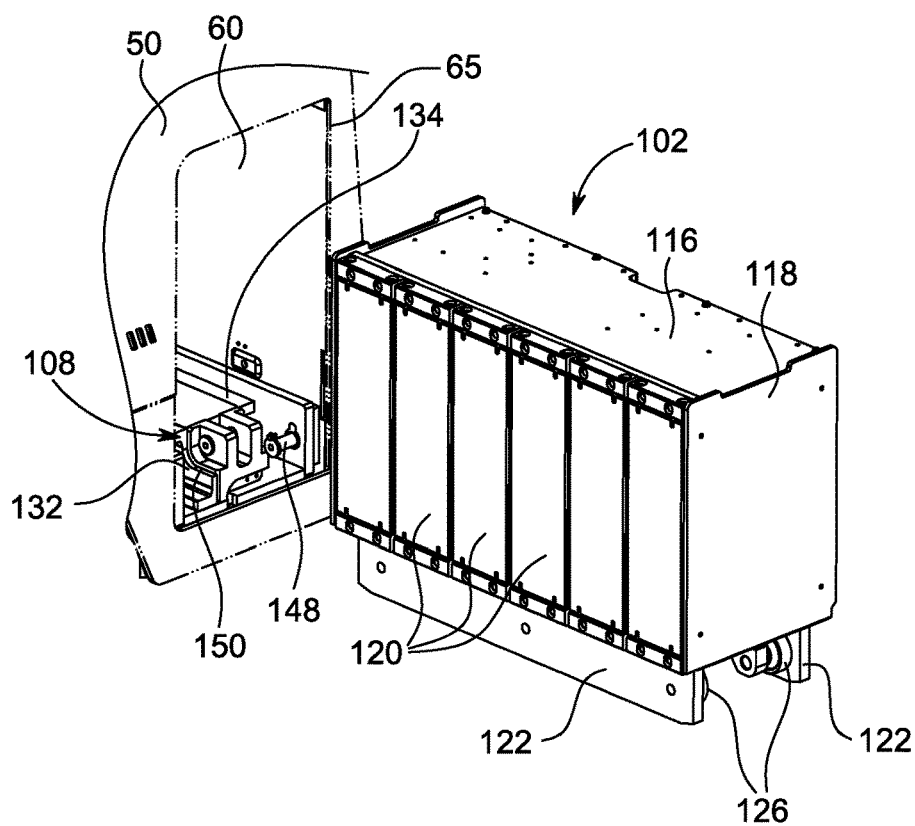
Figure 2C:
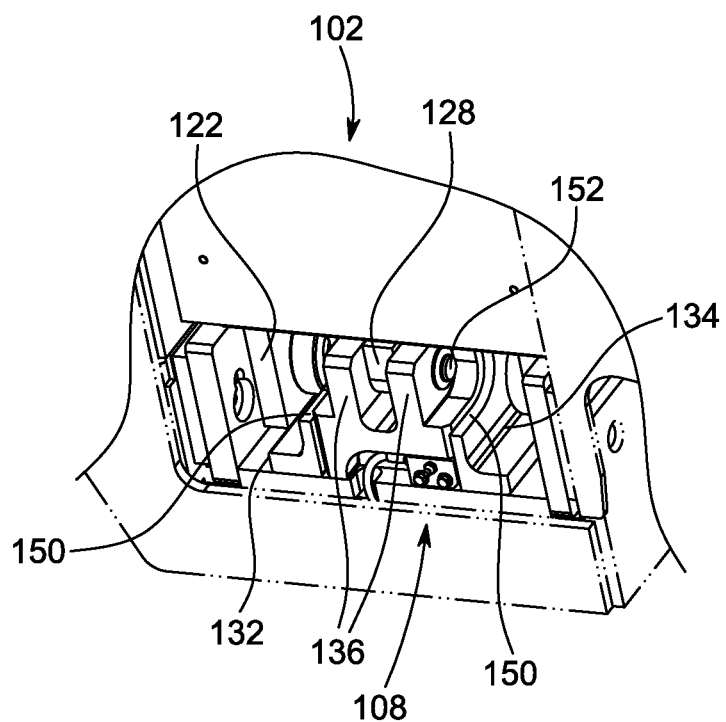
FIG. 2c is a perspective view of the battery assembly, the counterweight assembly, and the material handling vehicle of FIG. 2b, where the battery assembly is received by the counterweight assembly within the material handling vehicle.
Figure 2D:
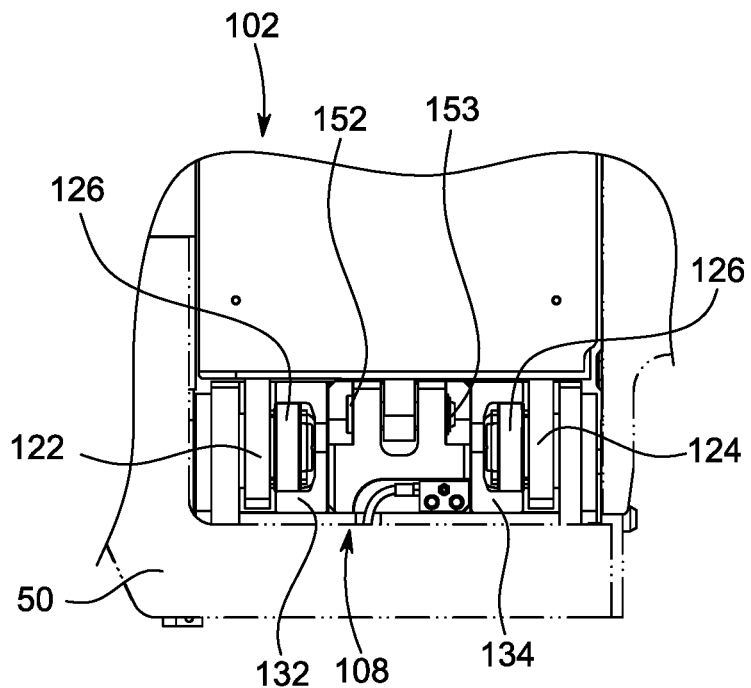
FIG. 2d is a front view of the battery assembly, the counterweight assembly, and the material handling vehicle of FIG. 2c.
Figure 3A:
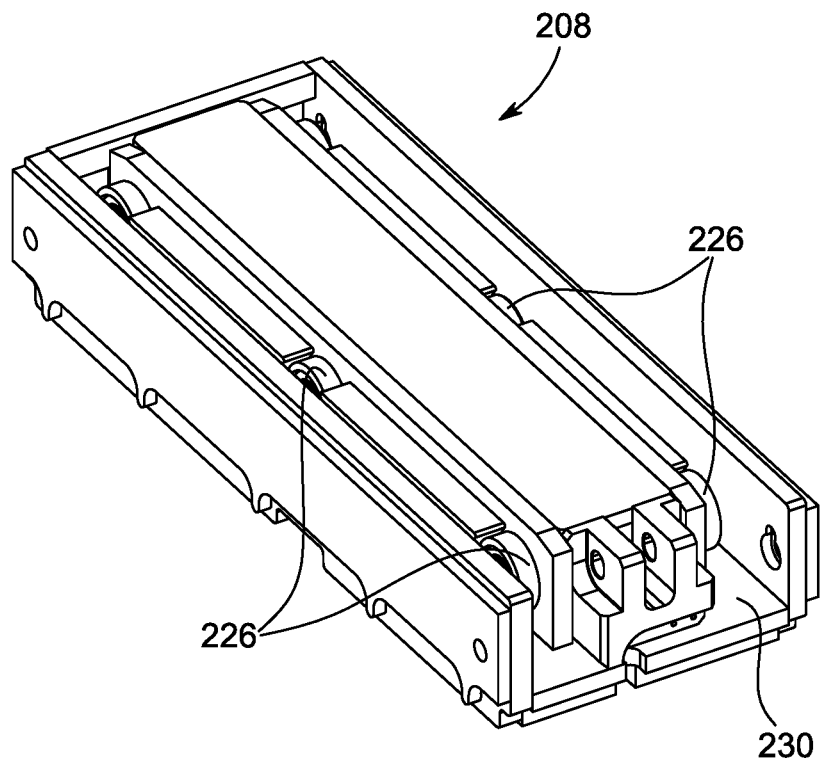
FIG. 3a is a perspective view of another counterweight assembly according to one aspect of the present disclosure.
Figure 3B:
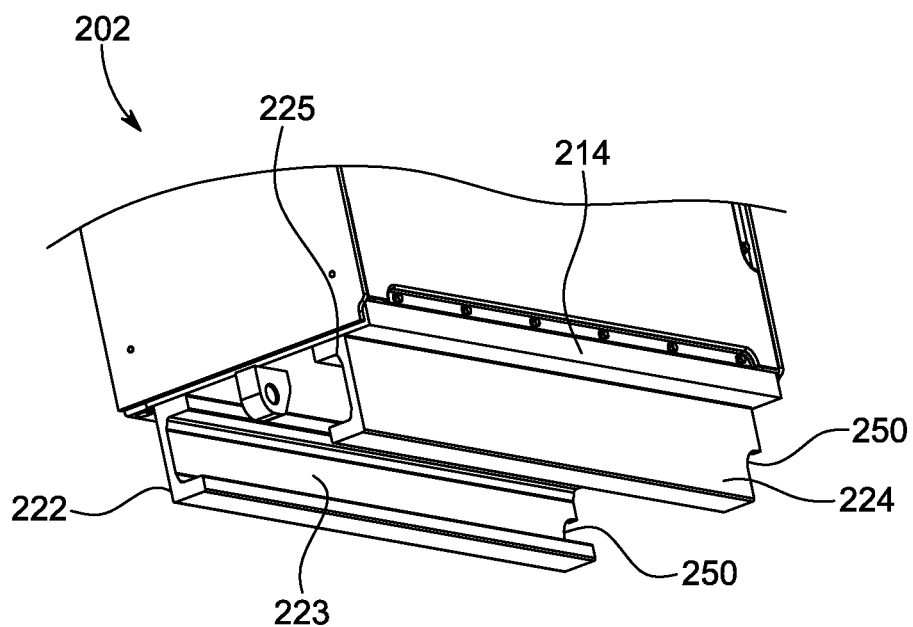
FIG. 3b is a perspective view of another battery assembly according to one aspect of the present disclosure.
Figure 4A:
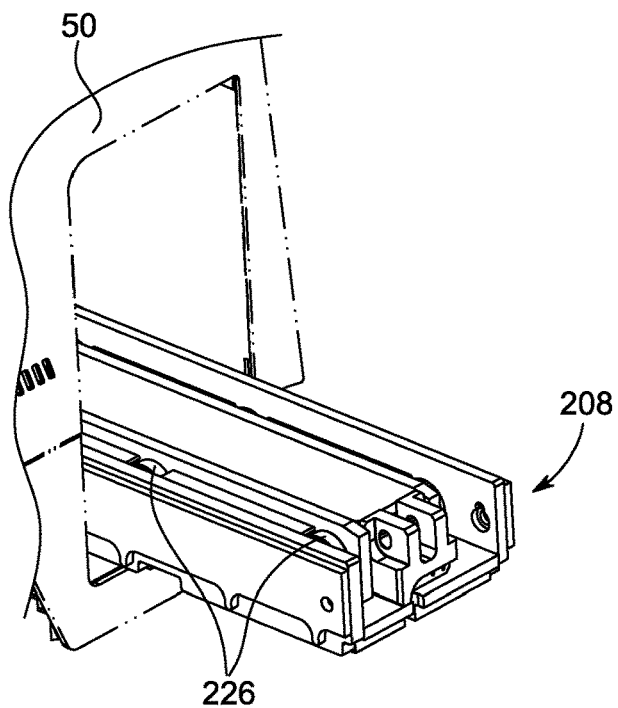
FIG. 4a is a perspective view of the counterweight assembly of FIG. 3a being installed within a material handling vehicle.
Figure 4B:
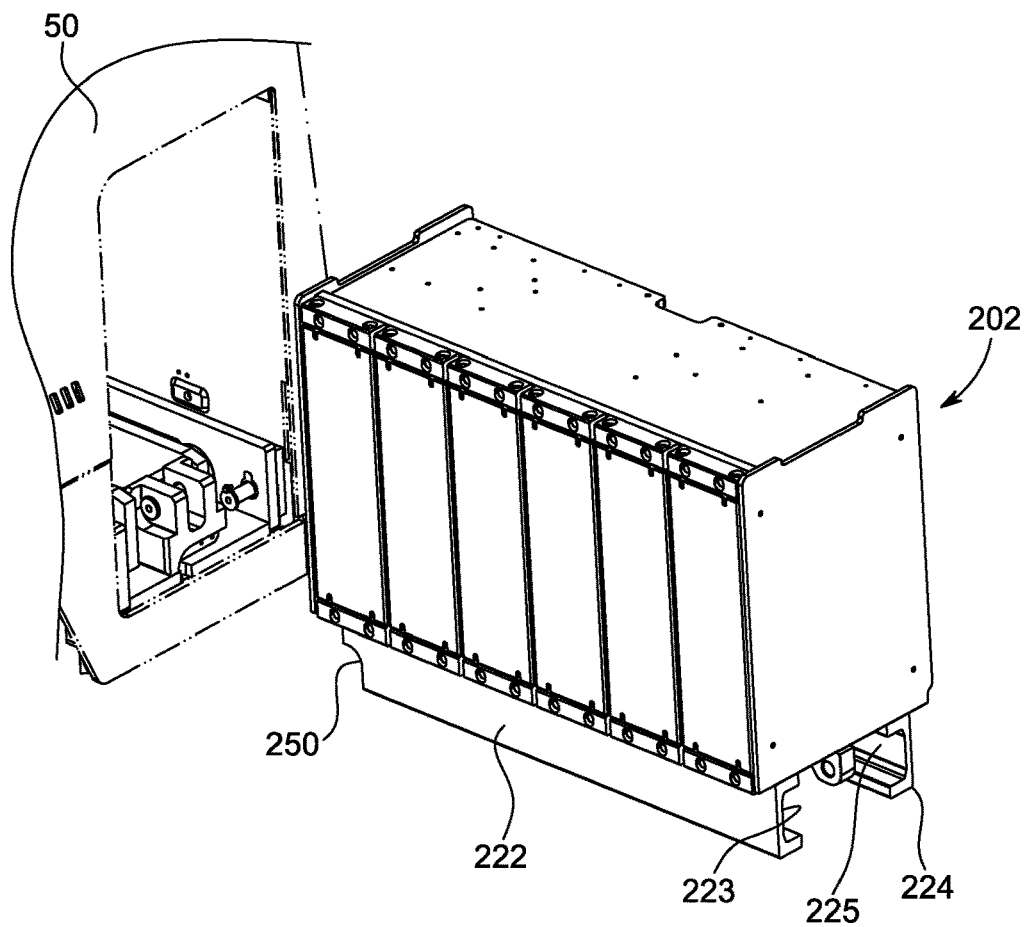
Figure 4C:
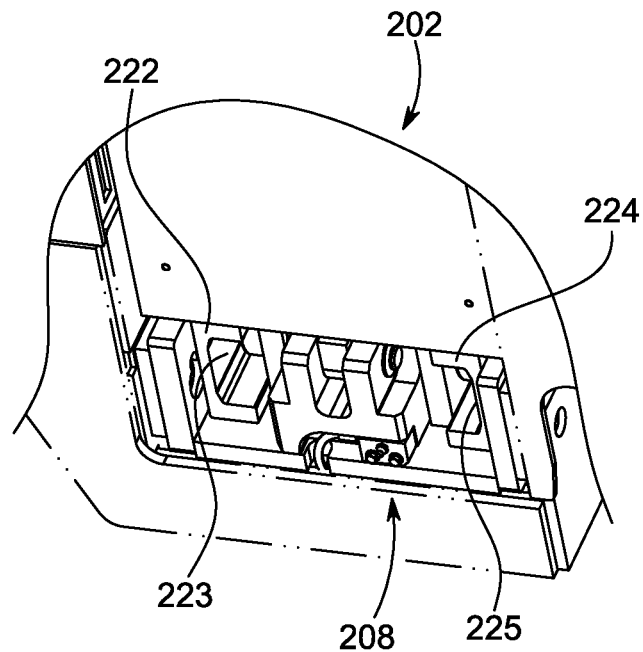
FIG. 4c is a perspective view of the battery assembly, the counterweight assembly, and the material handling vehicle of FIG. 4b, where the battery assembly is received by the counterweight assembly within the material handling vehicle.
Figure 4D:
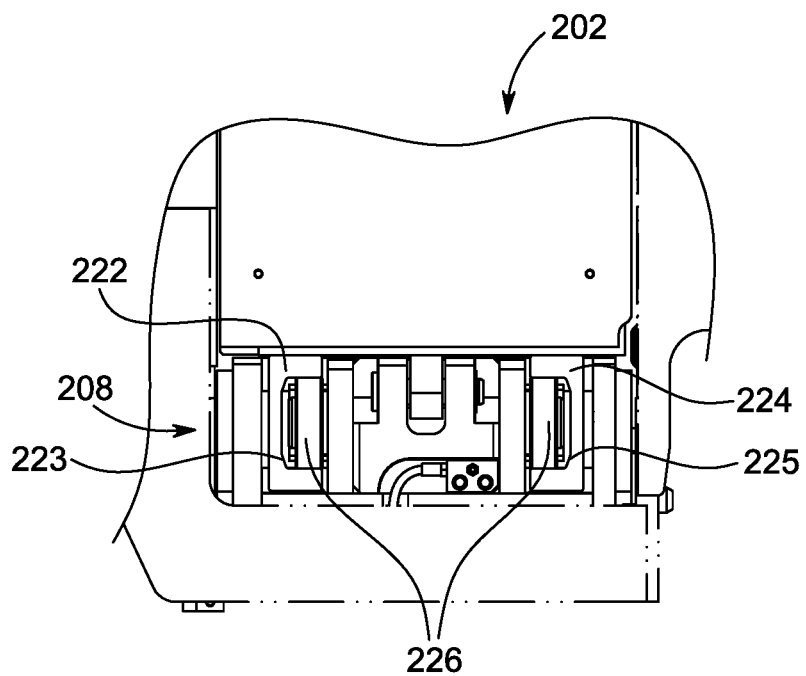
FIG. 4d is a front view of the battery assembly, the counterweight assembly, and the material handling vehicle of FIG. 4c.
Figure 5A:
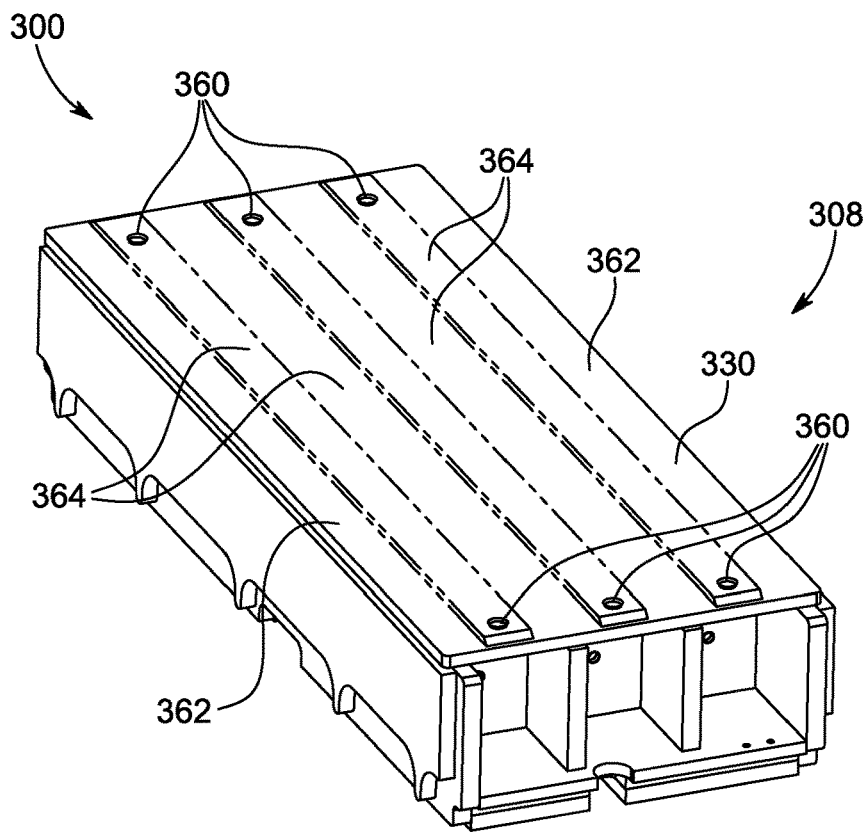
FIG. 5a is a perspective view of another counterweight assembly according to one aspect of the present disclosure.
Figure 5B:
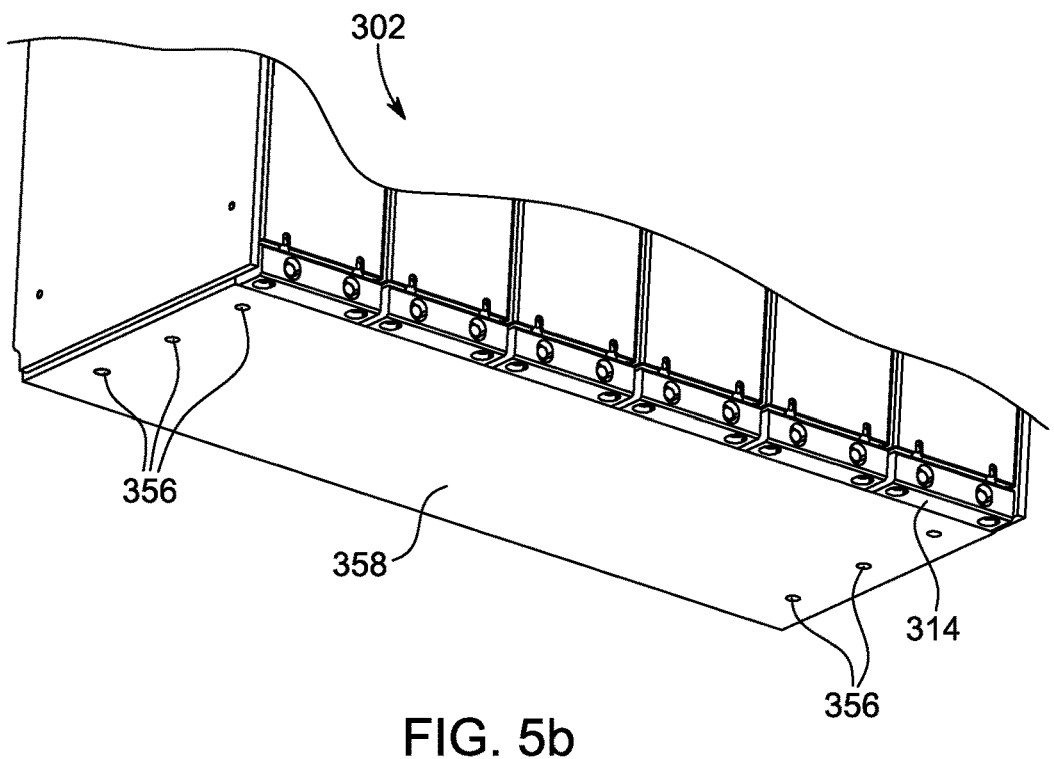
FIG. 5b is a perspective view of another battery assembly according to one aspect of the present disclosure.

In this way, and as illustrated in FIGS. 2a-2d, the battery assembly 102 can be coupled to the material handling vehicle 50. As illustrated in FIG. 2a, the counterweight assembly 108 can be maneuvered into the battery compartment 60 through a compartment opening 65, leading with the counterweight assembly back side 110, so that the counterweight assembly 108 is fully inserted in the battery compartment 60 and the counterweight assembly front side 109 is positioned proximate the compartment opening 65. The counterweight assembly 108 can then be maneuvered downward so the ridges 144 of the counterweight assembly 108 engage the slots of the material handling vehicle 50. Looking to FIG. 2b, the mounting pins 148 can be inserted into the mounting opening 140 and the corresponding enclosure opening, thereby coupling the counterweight assembly 108 to the material handling vehicle 50. After the counterweight assembly 108 has been secured to the material handling vehicle 50, the battery assembly 102 can be maneuvered so the set of roller bearings 126 closest to the battery assembly front side 103 enter the channels 132, 134 through the entry notches 150 and the battery assembly 102 is rolled into the battery compartment 60. Once the battery assembly 102 is fully received by the counterweight assembly 108, as illustrated in FIGS. 2c-2d, the retention pin 152 can be inserted through the battery bracket opening 129 and the counterweight bracket opening 137, thereby securing the battery assembly 102 to the counterweight assembly 108 and indirectly to the material handling vehicle 50.

Referring now to FIGS. 3a-4d, another non-limiting example of a modular battery system 200 including a battery assembly 202 and a counterweight assembly 208 is illustrated. In this non-limiting example, a left positioning portion 222 and a right positioning portion 224 can respectively include a left channel 223 and a right channel 225, and the counterweight assembly 208 can include a plurality of roller bearings 226 rotatably coupled to a counterweight base 230. The left and right channels 223, 225 can be configured to receive the rolling bearings 226 so that the rolling bearings 226 are retained in the left and right channels 223, 225. The roller bearings 226 may provide a rolling interface between the battery assembly 202 and the counterweight assembly 208. This can enable the battery assembly 202 to be rolled into position to be removably coupled to the counterweight assembly 208.

Referring now to FIGS. 5a-6d, another non-limiting example of a modular battery system 300 including a battery assembly 302 and a counterweight assembly 308 is illustrated. In this non-limiting example, the battery assembly 302 can include a battery base 314 with a plurality of battery retention openings 356 formed in a lower surface 358 of the battery base 314. The counterweight assembly 308 can include a counterweight base 330 which may have a plurality of counterweight retention openings 360 formed in an upper surface 362 of the counterweight base 330. The counterweight assembly 308 can further include at least one non-metal slide 364 coupled to the upper surface 362 of the counterweight base 360. The non-metal slide 364 can provide a sliding interface with the lower surface 358 of the battery base 314. In some non-limiting examples, a sliding interface can be formed between the lower surface 358 of the battery base 314 and the upper surface 362 of the counterweight base 330, and no non-metal slides 364 are included. The lower surface 358 of the battery base 314 can be received by the upper surface 362 of the counterweight base 330 so that the battery assembly 302 can be slid into position to be retained once the counterweight assembly 308 is in the battery compartment 60. At least one counterweight retention plate 349 can be coupled to the material handling vehicle 50 inside the battery compartment 60 and above the counterweight assembly 308 so that the counterweight assembly 308 is retained within the material handling vehicle 50. A plurality of retention pins 352 can be configured to simultaneously engage the battery retention openings 356 and the counterweight retention openings 360 to couple the battery base 314 to the counterweight base 330. At least one filler block 382 can be coupled to the counterweight base 330 proximate the retention pins 352 so that the retention pins 352 are retained in the battery retention openings 356 and the counterweight retention openings 360.

With reference to FIGS. 7a, 7c, and 8a-8b, yet another non-limiting example of a modular battery system 400 including a battery assembly 402 and a counterweight assembly 408a is illustrated. Here, the battery assembly 402 can include a battery base 412 and one positioning portion 468 coupled to the battery base 414. The positioning portion 468 can extend downwardly from the battery base 414 and can be positioned centrally with respect to the battery base 414. The counterweight assembly 408 can include a counterweight base 430 with a centrally positioned channel 470 defined by a left wall 472 and a right wall 474. A plurality of roller bearings 426 can be rotatably coupled to the left and right walls 472, 474 and may be positioned in recesses 476 formed in the left and right walls 472, 474. The roller bearings 426 can provide a rolling interface between the battery base 402 and the left and right walls 472, 474 of the counterweight base 430.

The battery assembly 402 can be rolled on the roller bearings 426 so that the positioning portion 468 is received in the channel 470 through a first entryway 471. Once the positioning portion 468 is fully received in the channel 470, a retention plate 478 can be coupled to the counterweight base 430 with at least one fastener 479 so that the first entryway 471 is blocked by the retention plate 478, thereby coupling the battery assembly 402 and the counterweight assembly 408a. An additional retention bolt 480 can be used to further secure the battery assembly 402 to the counterweight assembly 408a. In some non-limiting examples, the channel 470 runs the entire length of the counterweight base 430 and an additional retention plate 478 may be utilized to block a second entryway 477 on the opposite side of the channel 470 as the first entryway 471.

Figure 7A:
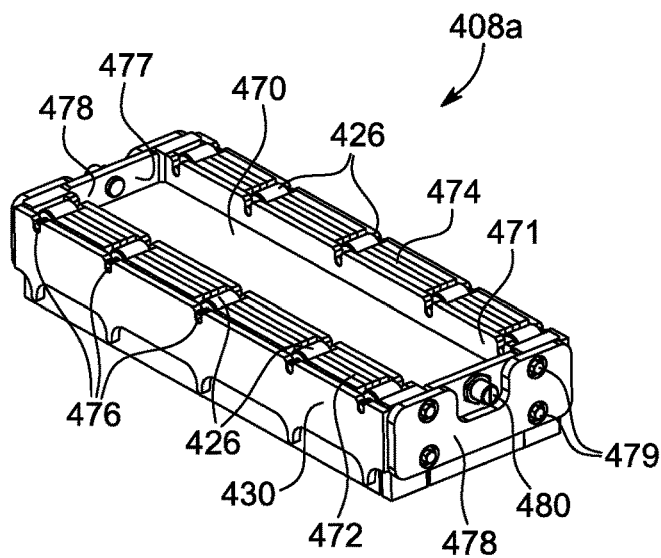
FIG. 7a is a perspective view of another counterweight assembly according to one aspect of the present disclosure.
Figure 7B:
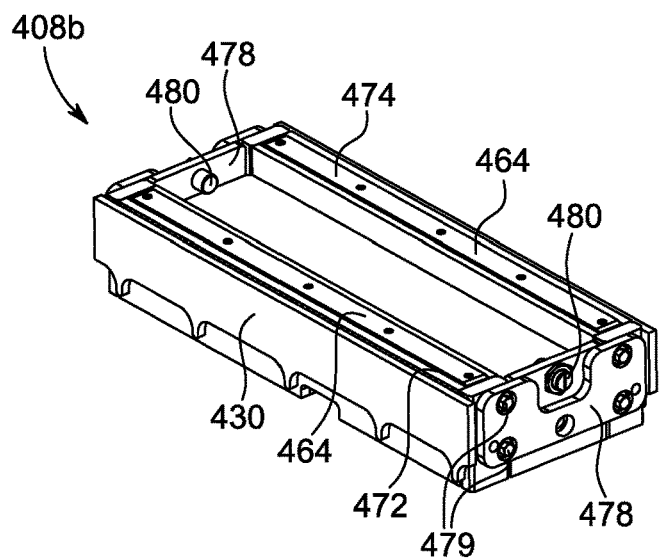
FIG. 7b is a perspective view of another counterweight assembly according to one aspect of the present disclosure.
Figure 7C:
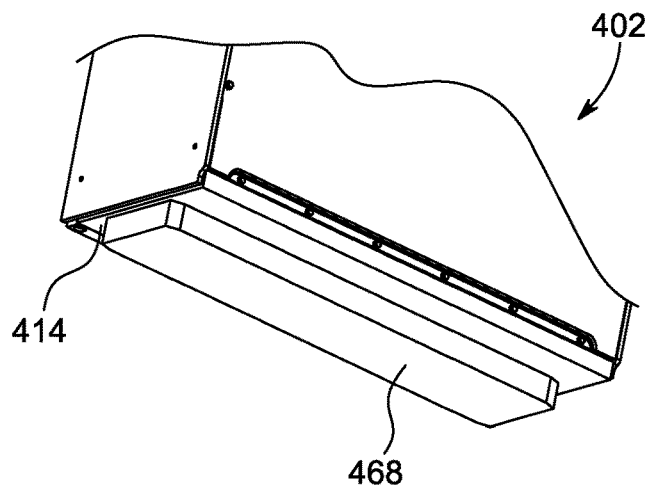
FIG. 7c is a perspective view of another battery assembly according to one aspect of the present disclosure.
Figure 8B:
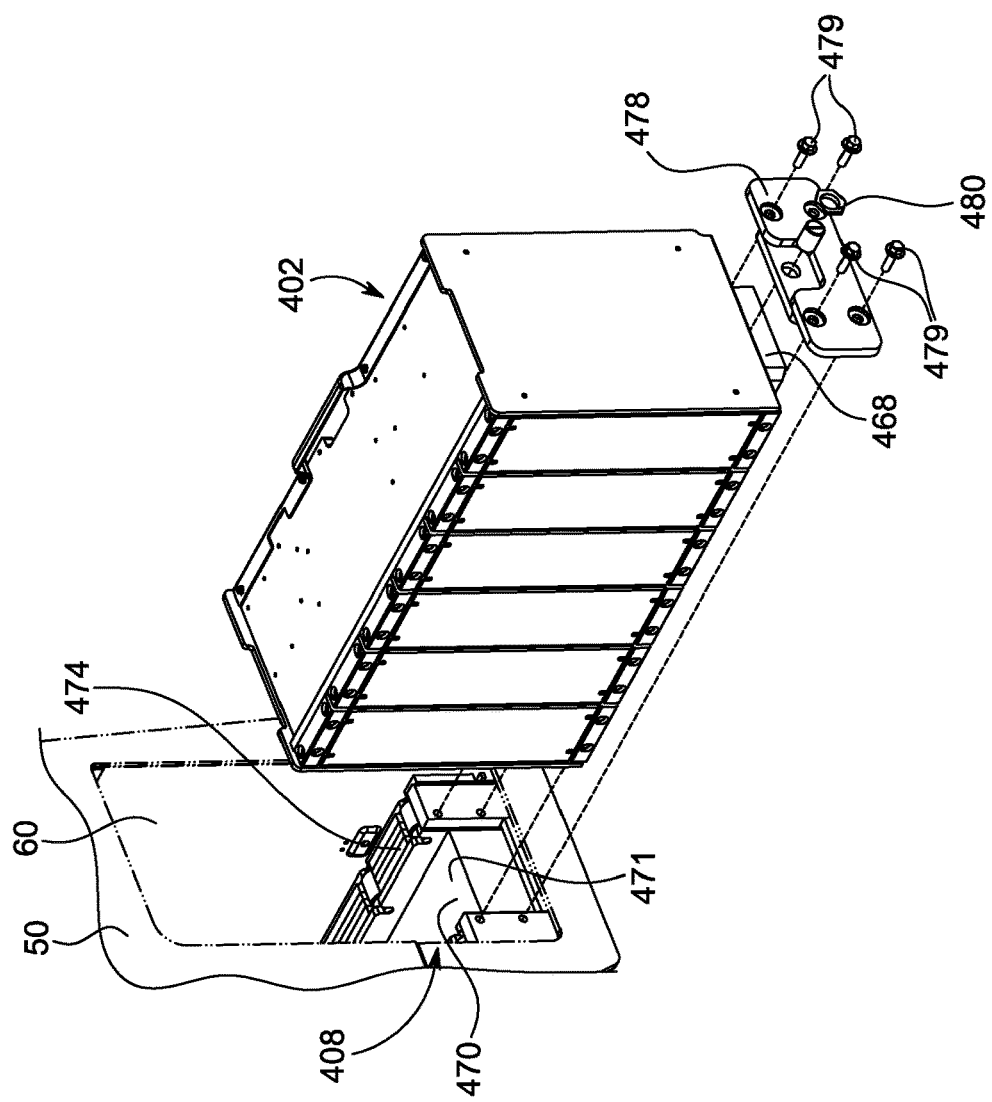
Figure 8A:
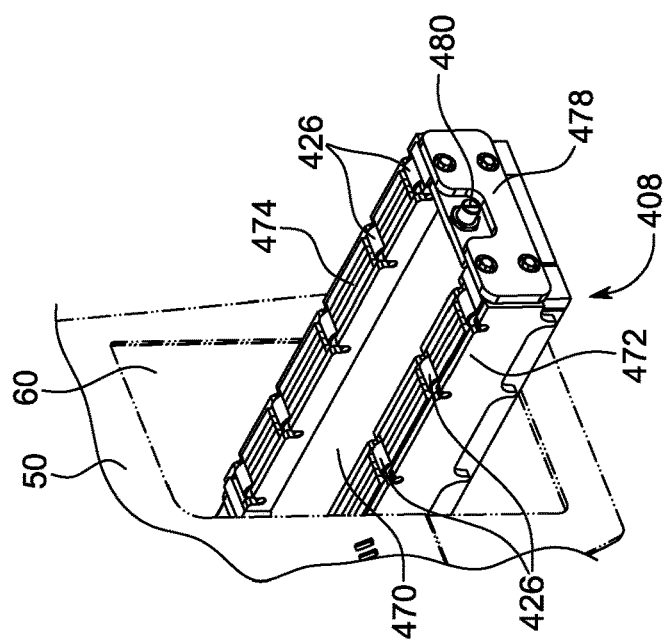
FIG. 8a is a perspective view of the counterweight assembly of FIG. 7a being installed within a material handling vehicle.
Figure 9A:
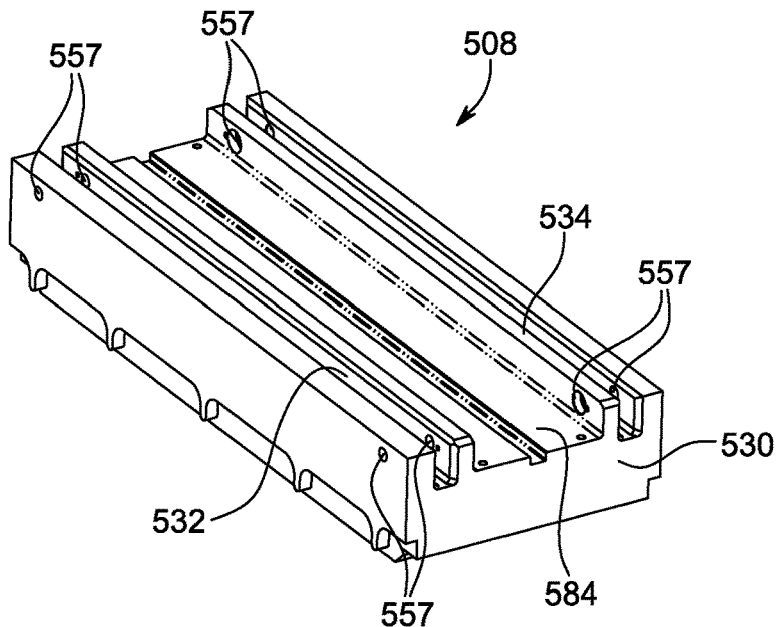
FIG. 9a is a perspective view of another counterweight assembly according to one aspect of the present disclosure.
Figure 9B:
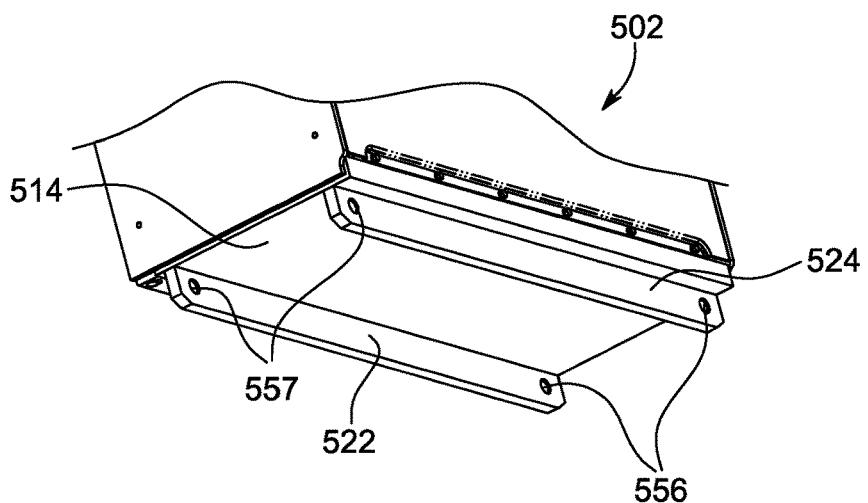
FIG. 9b is a perspective view of another battery assembly according to one aspect of the present disclosure.
Figure 9C:
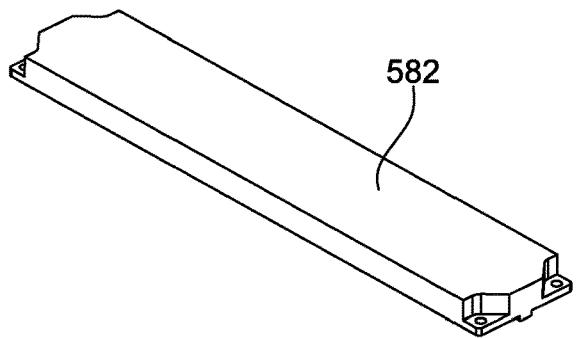
FIG. 9c is a perspective view of a filler plate assembly according to one aspect of the present disclosure.
Figure 10A:
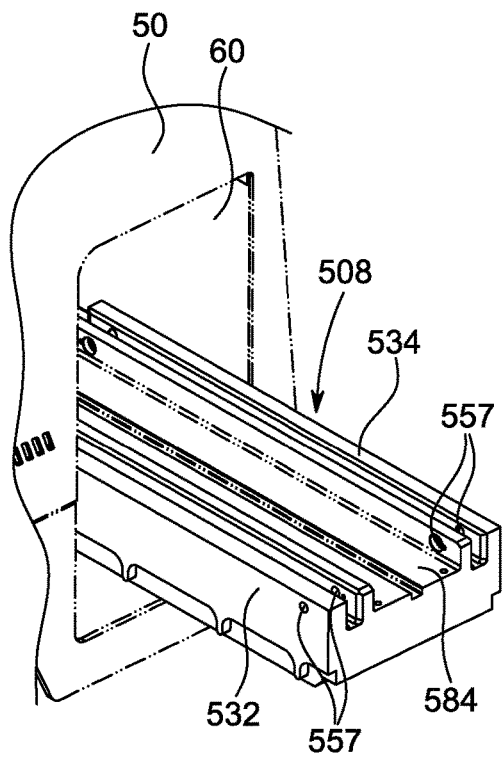
FIG. 10a is a perspective view of the counterweight assembly of FIG. 9a being installed within a material handling vehicle.
Figure 10B:
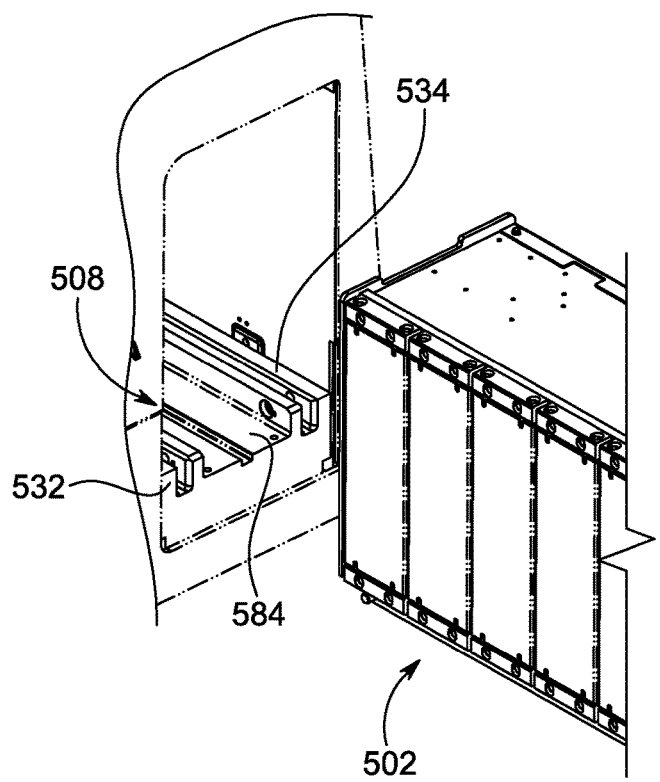
Figure 10C:
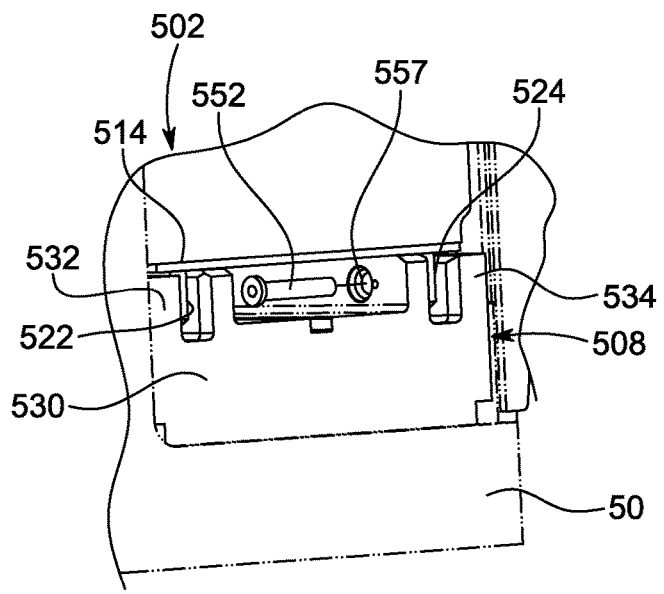
FIG. 10c is a perspective view of the counterweight assembly and the battery assembly of FIG. 10b installed within the material handling vehicle, with a retention pin coupling the counterweight assembly to the battery assembly.
Figure 11A:
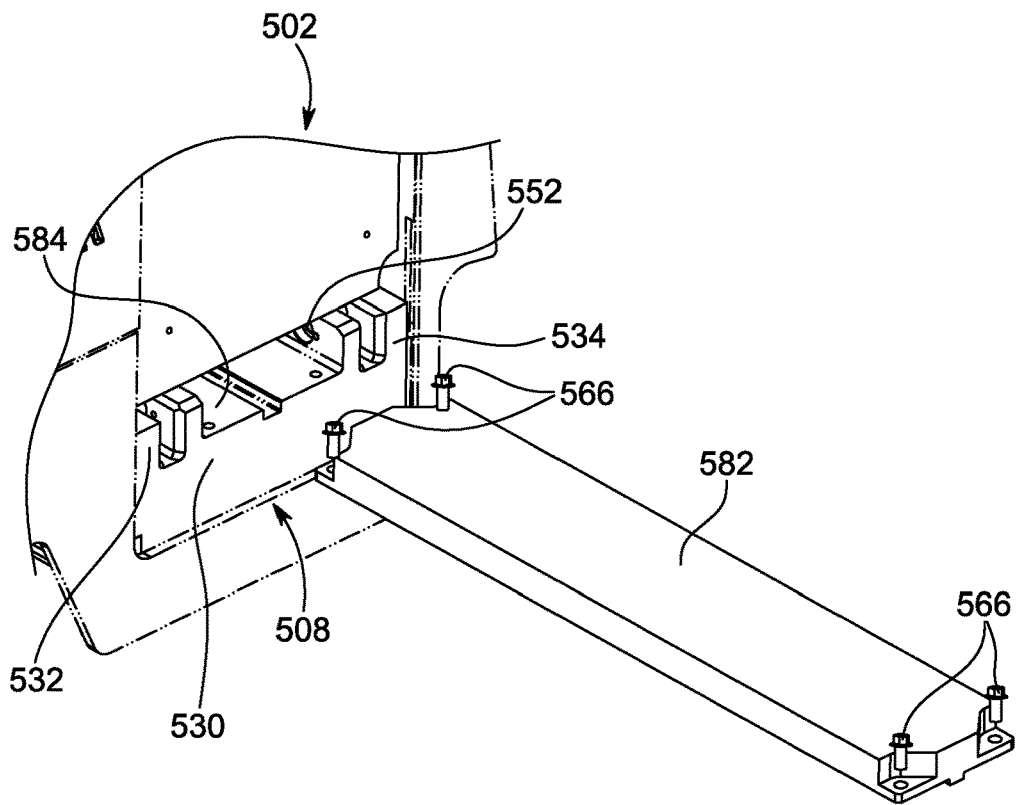
FIG. 11a is a perspective view of the filler plate of FIG. 9c being installed within the battery assembly, the counterweight assembly, and the material handling vehicle of FIG. 10c.
Figure 11B:
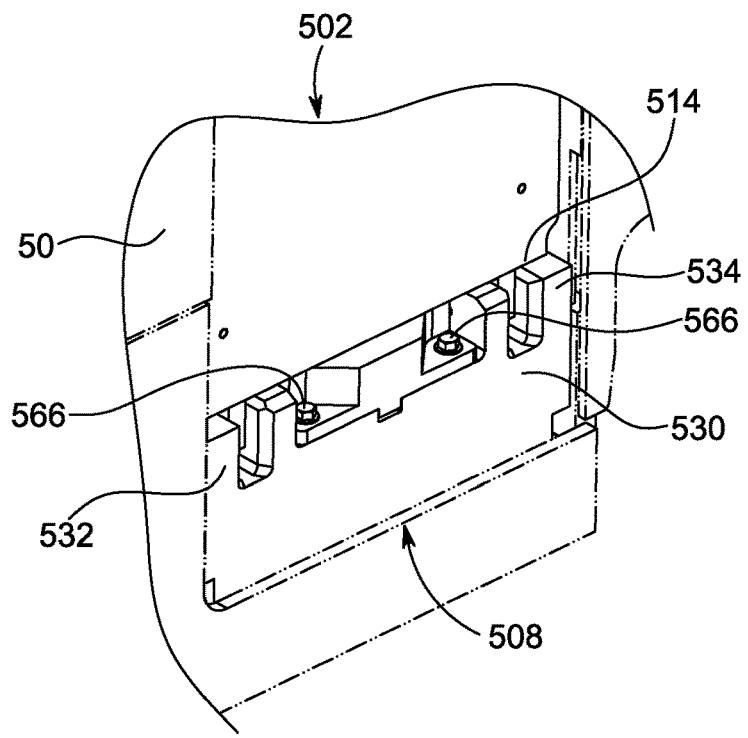

In some non-limiting examples, a counterweight base 408b (FIG. 7b) having at least one nonmetal slide 464 coupled to each of the left and right walls 472, 474 can be used in as an alternative to counterweight base 408 in the modular battery system 400.

Referring now to FIGS. 9a-11b, an non-limiting example of a modular battery system 500 including a battery assembly 502, a counterweight assembly 508, and a filler plate 582 is illustrated. The battery assembly 502 can include a left positioning portion 522 and a right positioning portion 524 with at least one battery retention opening 556 formed in at least one of the left positioning portion 522 and the right positioning portion 524. The counterweight assembly 508 can include a left channel 532 and a right channel 534 coupled to a counterweight base 530, and a central void 584 formed between the left channel and right channels 532, 534. At least one pair of counterweight retention openings 557 corresponding to a battery retention opening 556 can be formed in at least one of the left channel 532 and the right channel 534 so that one of the pair of counterweight retention openings 557 is formed on either side of the left channel 532 or the right channel 534 and so that the pair of counterweight retention openings 557 are concentric.

The left and right channels 532, 534 can be configured to receive the left and right positioning portions, respectively, allowing the battery assembly 502 to be slid into position to be coupled with the counterweight assembly 508. A retention pin 552 can be inserted into one of the counterweight retention opening 557 from the side of the central void 584 so that the retention pin 552 engages both of the pair of counterweight retention openings 557 and the corresponding battery retention opening 556. The filler plate 582 can be inserted into the central void 584 and may be coupled to the counterweight base 530 with at least one bolt 566. The filler plate 582 retains the retention pins 552 in the battery retention openings 556 and the counterweight retention opening 557, thereby coupling the battery base 514 to the counterweight base 530.

Figure 12:
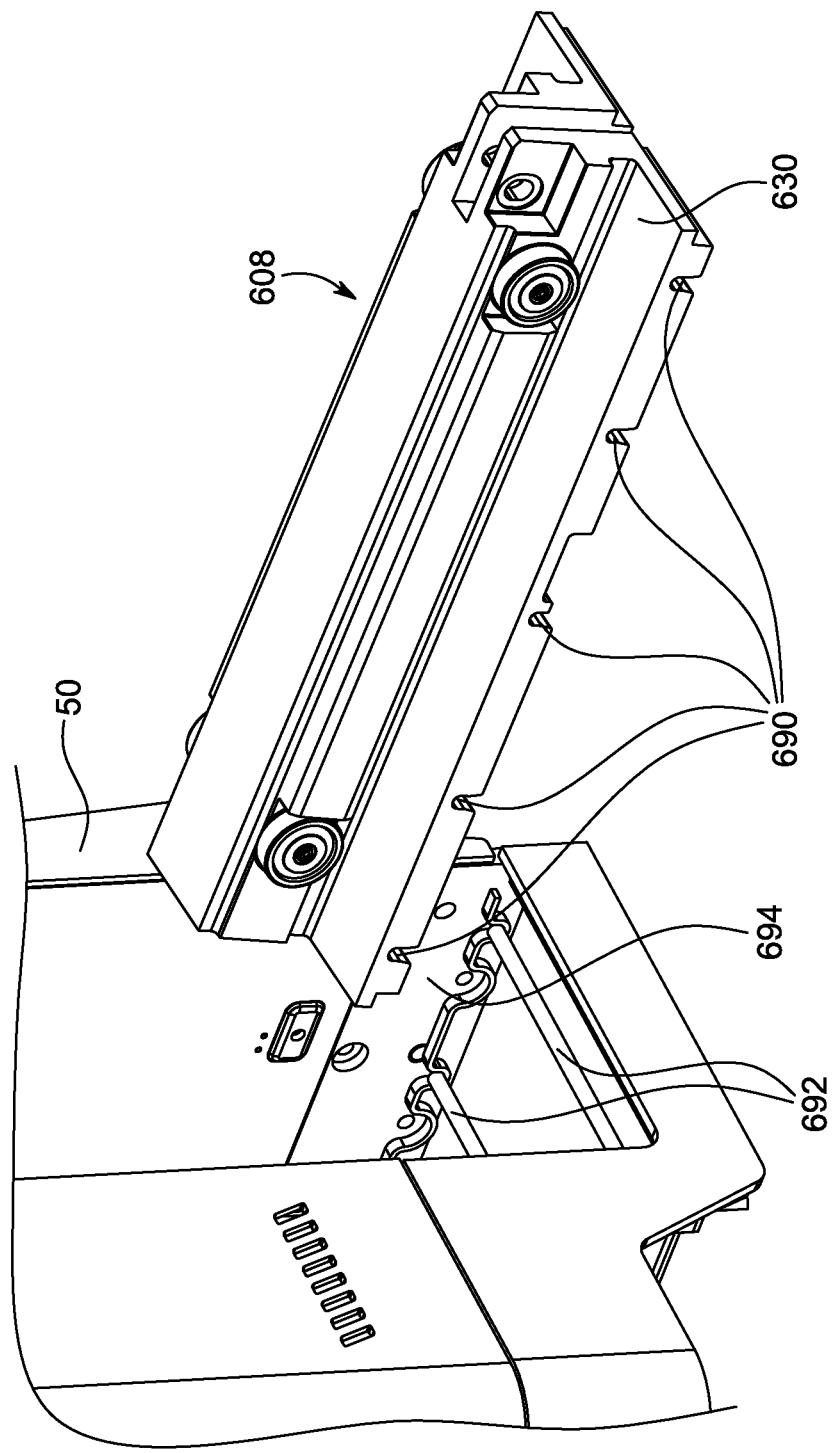
FIG. 12 is a perspective view of a counterweight assembly with a material handling vehicle according to one aspect of the present disclosure.

In some non-limiting examples, as illustrated in FIG. 12, the counterweight assembly 608 can include at least one positioning notch 690 formed in the bottom of the counterweight base 630. The positioning notches 690 can run longitudinally across the counterweight base and can be parallel to each other. Each one of the positioning notches 690 can be configures to receive a positioning bar 692 coupled to the material handling vehicle 50. The positioning bars 692 can be configured to restrict the motion of the counterweight assembly 108 with respect to the material handling vehicle 50 when the positioning bars 692 are engaged with the positioning notches 690. In some non-limiting examples, the positioning bars 692 may be connecter to a positioning bar frame 694 which can be coupled to the material handling vehicle. The positioning bars can also be separate parts, each individually coupled to the material handling vehicle 50, or can be integrally formed in the material handling vehicle 50.

In some non-limiting examples, a modular battery system can include a battery assembly that can use interchangeable mounting structures in order to adapt to be compatible with a variety of different counterweight and battery compartment configurations. For example, as illustrated in FIGS. 13-17, a modular battery system 700 can include a counterweight assembly 702, a battery assembly 704, and one or more mounting structures 708. The one or more mounting structures 708 may be selectively secured to the battery assembly 704 and facilitate attachment of the battery assembly 704 to the counterweight assembly 702.

Figure 13:
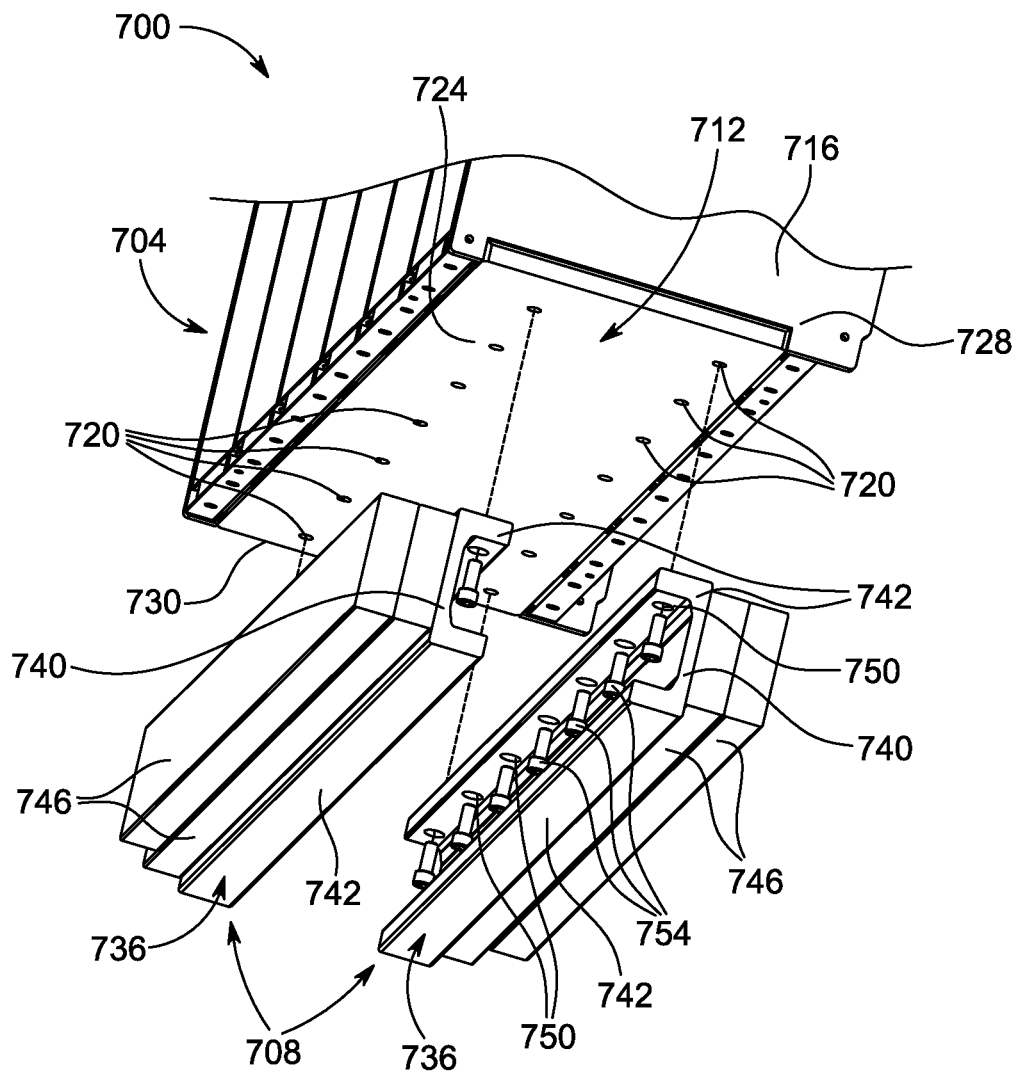
FIG. 13 is a perspective view of an adaptable battery assembly with two interchangeable mounting structures according to one aspect of the present disclosure.

With specific reference to FIG. 13, the battery assembly 704 can include a battery base 712 secured to the bottom side of a battery enclosure 716, which may be configured to house at least one energy source (e.g., a lithium ion battery). A plurality of base or battery assembly openings 720 can be arranged in a standardized pattern on a bottom side 724 of the battery assembly 704. For example, as illustrated in FIG. 13, the base openings 720 can be formed in the battery base 712, and may be arranged in a linear array having two rows of base openings 720 that are laterally spaced from one another and that extend between a front side 728 and a back side 730 of the battery assembly 704. In some non-limiting examples, a battery assembly can include at least one base opening 720 that is arranged in a different pattern.

It should also be appreciated that some non-limiting examples can include a battery assembly with an array of openings formed in a different location. For example, a standardized array of openings can be formed into a battery enclosure. Further, a battery assembly may have a standardized pattern of openings that is different than the illustrated pattern. For example, a battery base can include a pattern of base openings that includes more base openings or fewer base openings than the illustrated non-limiting example. A pattern of openings can also include an array with more rows or fewer rows than the illustrated pattern of openings. Additionally or alternatively, a pattern could include at least one of non-linear array (e.g., a lateral array), an irregular array, and a plurality of different arrays.

In the illustrated non-limiting example, the mounting structures 708 include a pair of channels 736 that are configured to be selectively coupled to the battery base 712. In the illustrated non-limiting example, each of the channels 736 define a generally C-shaped channels. When the channels 736 are coupled to the battery base 712, the channels 736 are laterally opposed to one another. Each of the channels 736 can include a base section 740 and two leg sections 742 extending laterally away (e.g., toward the opposing C-shaped channel) from opposite ends of the base section 740. At least one spacer 746 may be coupled to an outer surface 747 of the base section 740, and can extend along the longitudinal length (or a portion of the length) of the outer surface 747. In the illustrated non-limiting example, each of the outer surfaces 747 include two spacers 746 coupled thereto that protrude laterally outwardly therefrom (i.e., a first spacer 746 coupled to the outer surface 747 and a second spacer 746 coupled to the first spacer 746). The spacers 746 may provide additional counterweight to the battery assembly 704, when the channels 736 are coupled to the battery assembly 704.

Each of the channels 736 may include at least one channel or mounting structure opening 750 formed through at least one of the leg sections 742 and arranged in a pattern corresponding to the pattern of base openings 720 on the battery assembly 704. For example, in the illustrated non-limiting example, one of the leg sections 742 on each of the channels 736 on can include a plurality of channel openings 750 spaced longitudinally along the length of the leg section 742 in a pattern corresponding to at the base openings 720.

A fastener 754 (e.g., a screw, pin, bolt, or any other fastener) can be installed into each of the base openings 720 through a corresponding one of the channel opening 750 in order to couple the mounting structure 708 to the bottom side 724 of the battery assembly 704. In some non-limiting examples, each of the channel openings 750 may correspond with one of the base openings 720 and can be configured to be engaged by a fastener 754. In this way, for example, the channels 736 may be selectively coupled to the battery assembly 704.

In some non-limiting examples, a battery assembly according to the present disclosure may be configured to be coupled to more or less than two mounting structures. In some non-limiting examples, a battery assembly according to the present disclosure may be configured to be coupled to two differently shaped or designed mounting structures.

With continued reference to FIG. 13, the channels 736 can be coupled to the battery base 712 so that each of the channels 736 faces laterally inward towards the opposite channel 736. The gap between the two channels 736 can provide a counterweight-receiving slot 758 dimensioned to receive and engage the counterweight assembly 702. In some non-limiting examples, similar to the battery assembly 102, the battery assembly 704 may include a battery bracket 760 defining a battery bracket opening (not shown) that extends from the bottom side 724 of the battery assembly 704, e.g., on the battery base 712 (see FIG. 17).

Figure 14:
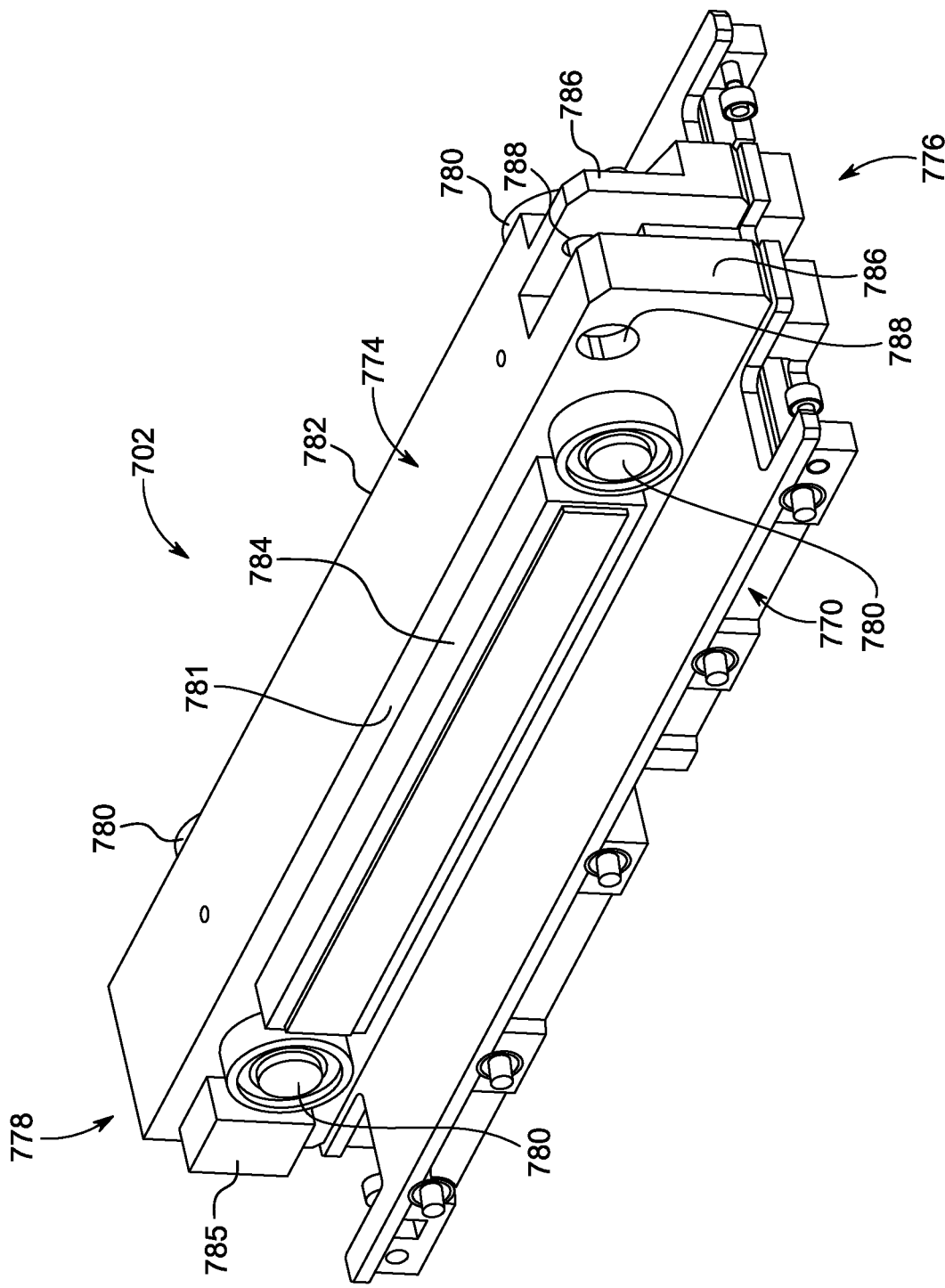
FIG. 14 is a perspective view of a counterweight assembly configured to receive the battery assembly of FIG. 13.
Figure 15:
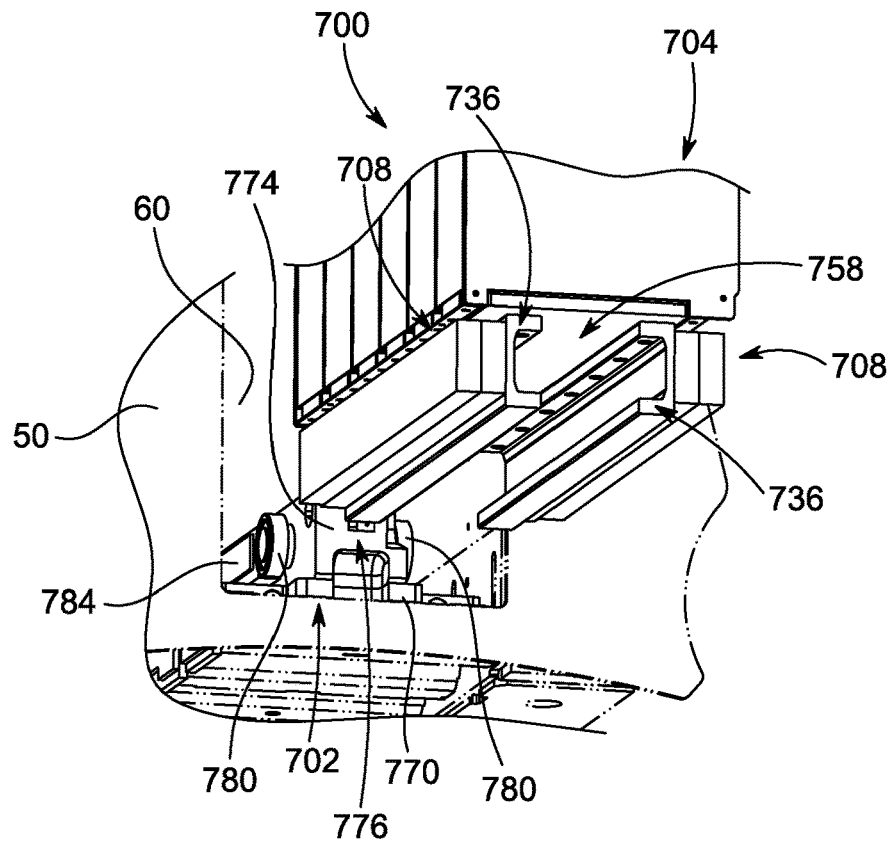
FIG. 15 is a perspective view of the battery assembly and mounting structures of FIG. 13 with the counterweight assembly of FIG. 14 received in a material handling vehicle, where the mounting structures are coupled to the battery assembly.
Figure 16:
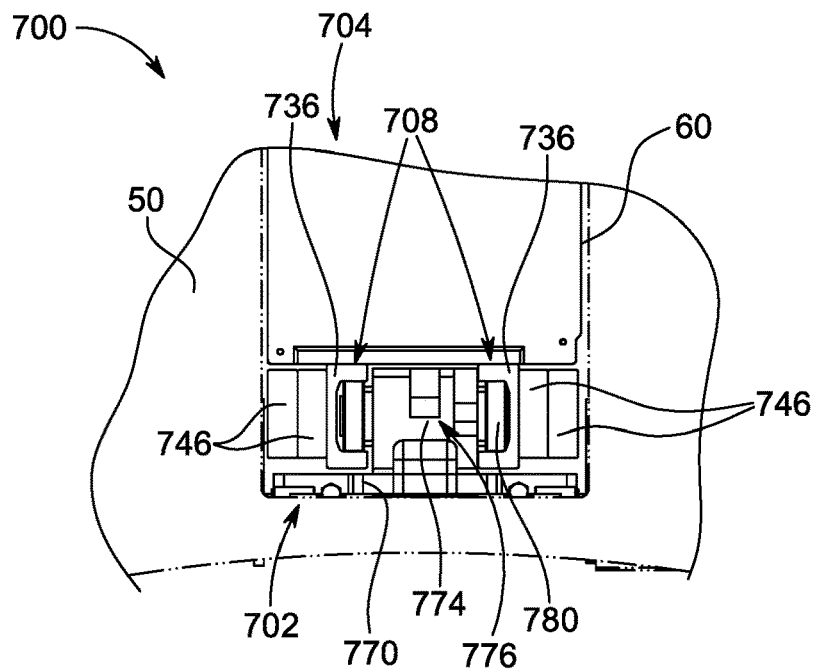
FIG. 16 is a perspective view of the battery assembly, the mounting structures, and the counterweight assembly of FIG. 15 installed within the material handling vehicle.

With specific reference to FIG. 14, the counterweight assembly 702 can include a counterweight base 770 configured to engage the battery compartment 60 of the material handling vehicle 50 (see FIGS. 15-17), and a central block 774 can be supported on the counterweight base 770. The central block 774 can protrude upwardly (e.g., from the perspective of FIG. 14) from the counterweight base 770, and can extend between a front side 776 and a back side 778 of the counterweight assembly 702. In the illustrated non-limiting example, the lateral sides of the central block 774 are spaced from the lateral edges defined by the counterweight base 770. In other words, a gap or absence of space is arranged between the lateral sides of the central block 774 and the lateral edges of the counterweight base 770.

The counterweight assembly 702 may include at least one roller bearing 780 configured to provide a rolling interface between the counterweight assembly 702 and the battery assembly 704. For example, as illustrated in FIG. 14, the central block 774 may include a first lateral surface 781 and a second lateral surface 782 that opposes the first lateral surface 781. Each of the first lateral surface 781 and the second lateral surface 782 may include at least one roller bearing 780 rotatably coupled thereto. In the illustrated non-limiting example, each of the first lateral surface 781 and the second lateral surface 782 include two roller bearings 780 that are spaced from one another along the longitudinal direction of the central block 774. In some non-limiting examples, the first lateral surface 781 and the second lateral surface 782 may include more or less than two roller bearings 780 rotatably coupled thereto. Each of the first later surface 781 and the second lateral surface 782 may include a first bearing spacer 784 and a second bearing spacer 785. The first bearing spacer 784 may protrude laterally outwardly from the respective one of the first lateral surface 781 and the second lateral surface 782 and may extend longitudinally between the two roller bearings 780 arranged on the respective one of the first lateral surface 781 and the second lateral surface 782. In the illustrated non-limiting example, the second bearing spacer 785 may protrude laterally outwardly from the respective one of the first lateral surface 781 and the second lateral surface 782 and may extend longitudinally from the back side 778 to a position adjacent to the one of the roller bearings 780 arranged adjacent to the back side 778.

Similar to the counterweight assembly 108, the counterweight assembly 702 may include at least one counterweight bracket 786 including a counterweight bracket opening 788. In the illustrated non-limiting example, the central block 774 includes two laterally spaced counterweight brackets 786 arranged adjacent to the front side 776. Each of the counterweight brackets 786 may include a counterweight bracket opening 788 arranged therein and extending laterally therethrough.

With reference to FIGS. 13-17, to secure the battery assembly 704 to the counterweight assembly 702, the counterweight assembly 702 secured within the battery compartment 60 of the material handling vehicle 50. Once the counterweight assembly 702 is secured within the battery compartment 60, the battery assembly 704 with the channels 736 attached thereto can be inserted onto the counterweight assembly 702. Specifically, the battery assembly 704 can be inserted onto the counterweight assembly 702, so that the central block 774 slides into the counterweight-receiving slot 758 and the roller bearings 780 receive the channels 736 (see FIG. 15). The rolling interface between the roller bearings 780 and the channels 736 can then allow the battery assembly 704 to be rolled into the battery compartment 60. Once received in the battery compartment (see FIG. 16), vertical movement of the battery assembly 704 can be restricted by the engagement between the roller bearings 780 and the channels 736.

Figure 17:
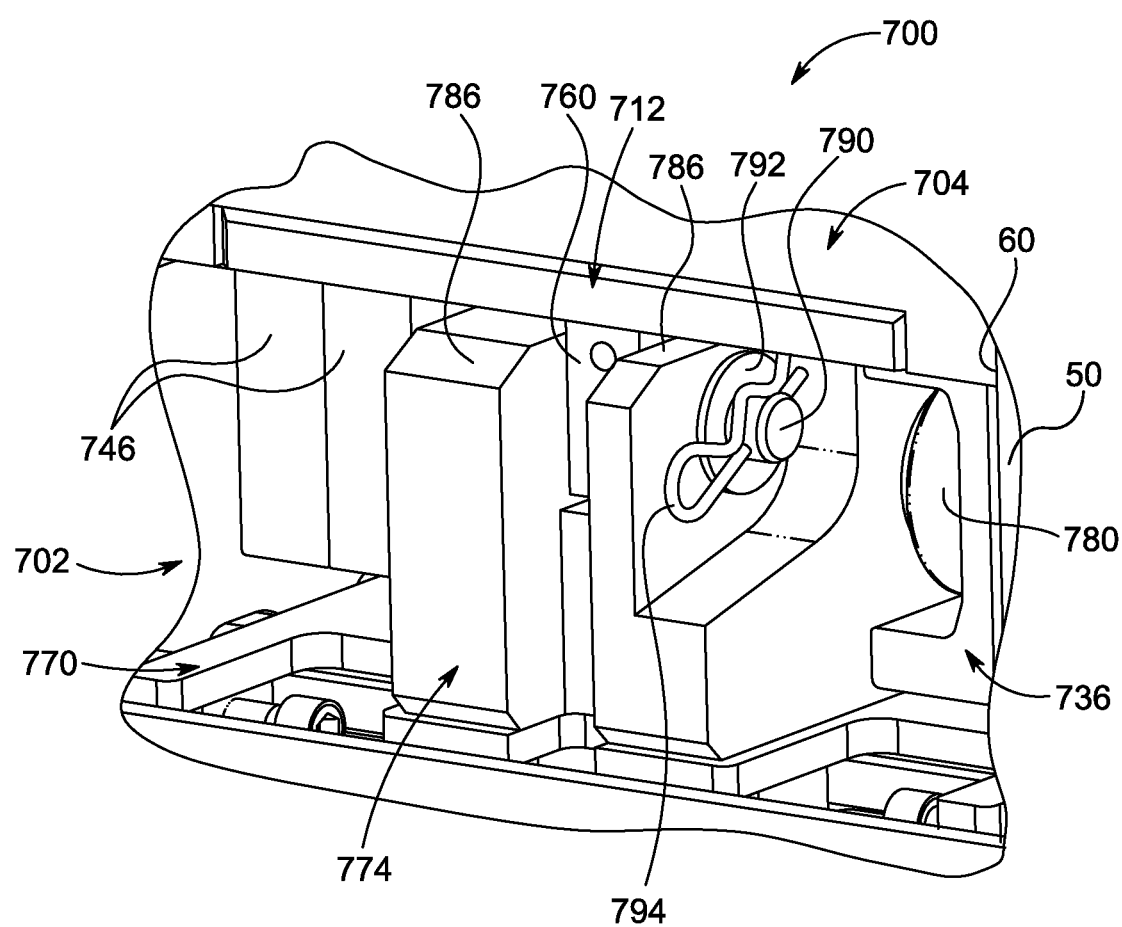
FIG. 17 is a partial perspective view of the battery assembly, the mounting structure, and the counterweight assembly of FIG. 16 illustrating a coupling pin configured to secure the battery assembly to the counterweight assembly.

As illustrated in FIG. 17, once the battery assembly 704 is installed onto the counterweight assembly 702, the battery bracket 760 may be arranged between the counterweight brackets 786, so that the counterweight bracket openings 788 axially align with the battery bracket opening (not shown). A retention pin 790 may be inserted through the counterweight bracket openings 788 and the battery bracket opening (not shown), and a washer 792 and a clip 794 may be used to prevent the retention pin 790 from being removed. With the retention pin 790 inserted through the counterweight bracket openings 788 and the battery bracket opening (not shown), the battery assembly 704 may be prevented from being removed from the counterweight assembly 702 (e.g., the roller bearings 780 may be prevented from displacing relative to the channels 736).

It should be appreciated that non-limiting examples of the battery assembly 704 illustrated in FIGS. 13-17 may be configured to be coupled to at least one mounting structure that is different than the mounting structures 708 of FIGS. 13-17. For example, a mounting structure can include at least one of a positioning portion, a channel, a metal slide, a non-metal slide, a roller bearing, any other structure or feature that was described in conjunction with any of FIGS. 1-12, or any other structure or feature configured for engaging a counterweight assembly. In some non-limiting examples, a battery assembly can be configured to be coupled to a plurality of different mounting structures. At least one mounting structure opening formed in each of the mounting structures can correspond to at least one battery assembly opening arranged in a standardized pattern of openings on the battery assembly, thereby making the plurality of mounting structures interchangeable. This can be useful, for example, so that one battery assembly may be used with multiple different counterweight assemblies. Using different mounting structures interchangeably, a battery assembly may be adapted to be secured to a counterweight assembly that has at least one of a positioning portion, a channel, a metal slide, a non-metal slide, a roller bearing, any other structure or feature that was described in conjunction with any of FIGS. 1-12, or any other structure or feature for receiving a battery assembly. In some non-limiting examples a mounting structure configured to secure a battery assembly to a first counterweight assembly can be removed from the battery assembly and interchanged for a different mounting structure in order to secure the battery assembly to a second, different counterweight assembly. Further, some non-limiting examples can include a first battery base that is configured to be interchangeably secured to a battery enclosure and having a first pattern of base openings. The first battery base can be interchanged or replaced with a second battery base that includes a second, different pattern of openings, thereby enabling different mounting structures to be coupled to the battery assembly.

Figure 18:
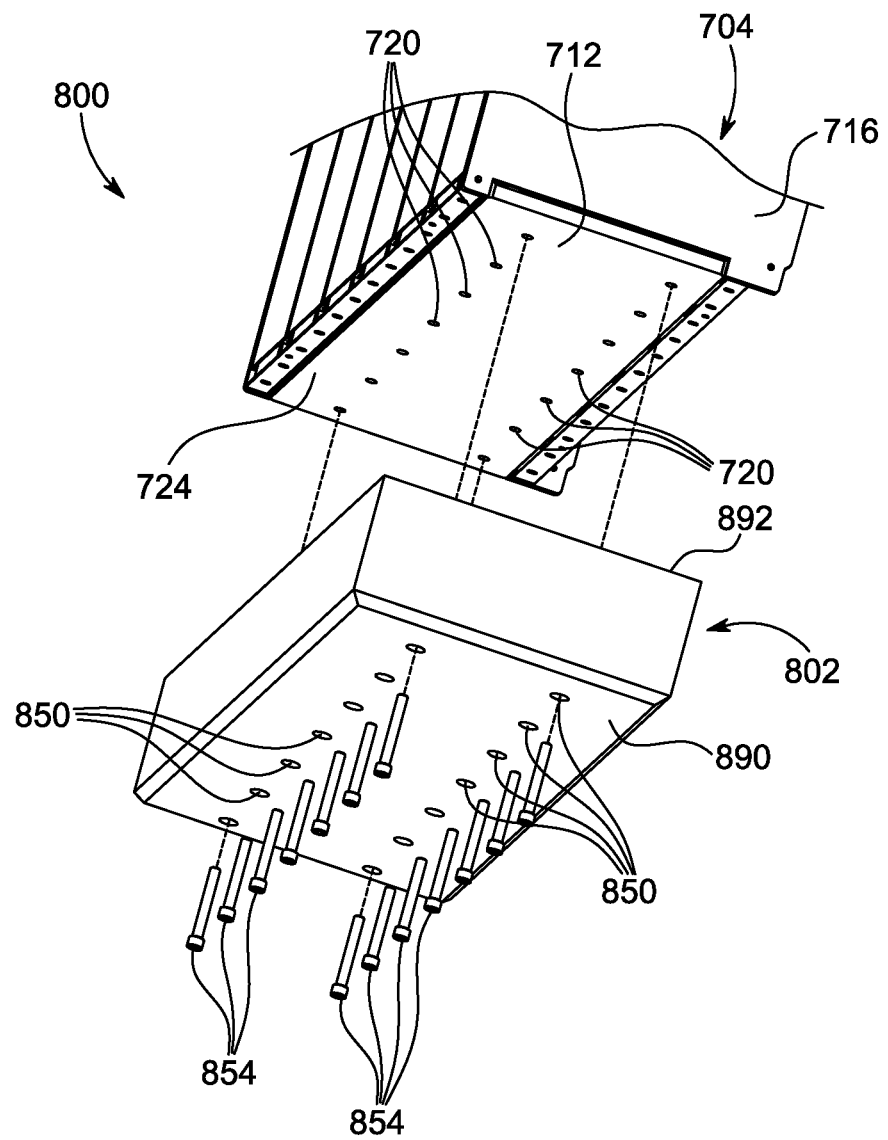
FIG. 18 is a perspective view of another adaptable battery assembly with a counterweight.
Figure 19:
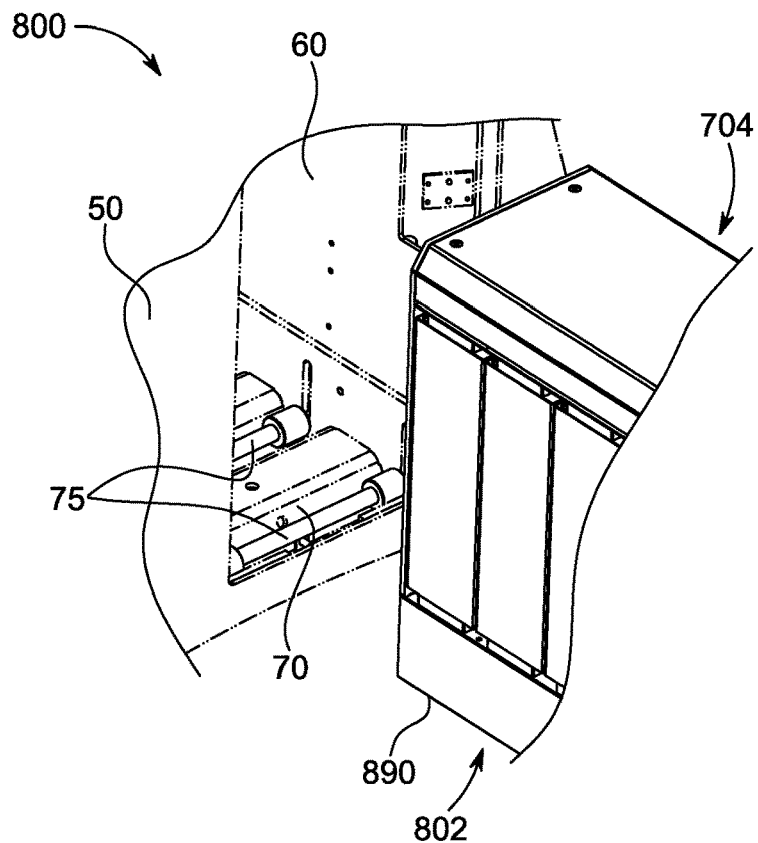
FIG. 19 is a perspective view of the battery assembly and counterweight of FIG. 18 with a material handling vehicle including a roller assembly.
Figure 20:
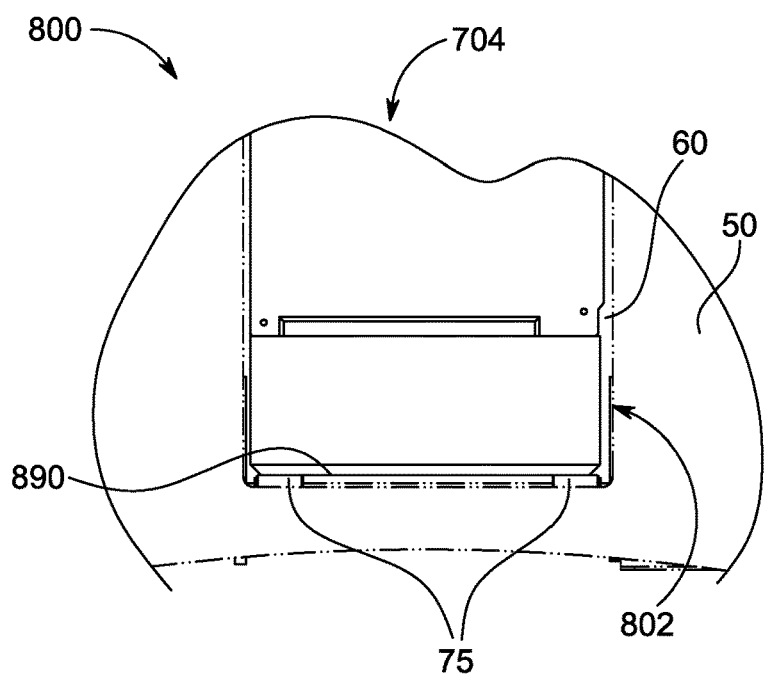
FIG. 20 is a perspective view of the battery assembly and the counterweight of FIG. 19 installed within the material handling vehicle.

Some non-limiting examples of a modular battery system can include a battery assembly that is configured to be coupled directly to a counterweight. For example, as illustrated in FIGS. 18-20, a modular battery system 800 can include a counterweight 802 configured to be removably secured to the battery assembly 704. The counterweight 802 can include a plurality of counterweight openings 850 that extend through the counterweight 802 (e.g., from a lower surface 890 of the counterweight to an upper surface 892 from the perspective of FIG. 18), and that are arranged in a pattern corresponding to the standardized pattern of base openings 720 in the battery assembly 704. A fastener 854 can be inserted through each of the counterweight openings 850 to engage a corresponding one of the base openings 720, thereby securing the upper surface 892 of the counterweight 802 to the bottom side 724 of the battery assembly 704 and coupling the counterweight 802 to the battery assembly 704.

Referring to FIGS. 19 and 20, the battery compartment 60 of the material handling vehicle 50 can include a roller assembly 70 with at least one roller 75 extending laterally across the battery compartment 60. For example, the roller assembly 70 may include a plurality of rollers 75 spaced along the floor of the battery compartment 60. The rollers 75 can be configured to provide a rolling interface between the battery compartment 60 and the lower surface 890 of the counterweight 802, thereby enabling the battery assembly 704 to be rolled into the battery compartment 60.

Within this specification non-limiting examples have been described in a way which enables a clear and concise specification to be written, but it is intended and will be appreciated that non-limiting examples may be variously combined or separated without parting from the invention. For example, it will be appreciated that all preferred features described herein are applicable to all aspects of the invention described herein.

Thus, while the invention has been described in connection with particular non-limiting examples and examples, the invention is not necessarily so limited, and that numerous other non-limiting examples, examples, uses, modifications and departures from the non-limiting examples, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A modular battery system for a material handling vehicle, the modular battery system comprising:
a counterweight assembly;
a battery assembly enclosing a power source and including a battery base; and
a pair of channels removably coupled to the battery base and laterally separated from one another to define a counterweight slot therebetween, wherein the battery assembly is configured to be slidably installed onto the counterweight assembly with the counterweight assembly received within the counterweight slot defined between the pair of channels.

2. The modular battery system of claim 1, further comprising at least one roller bearing coupled to the counterweight assembly and configured to provide a rolling interface between the pair of channels and the counterweight assembly.

3. The modular battery system of claim 1, wherein the counterweight assembly includes a central block protruding from a central base, and wherein the central block defines a first lateral surface and a second lateral surface.

4. The modular battery system of claim 3, wherein the each of the first lateral surface and the second lateral surface includes at least two roller bearings that are longitudinally separated from one another.

5. The modular battery system of claim 4, wherein each of the first lateral surface and the second lateral surface includes a first bearing spacer arranged longitudinally between the at least two roller bearings and a second bearing spacer arranged adjacent to a back side of the counterweight assembly.

6. The modular battery system of claim 1, wherein the counterweight assembly includes at least one counterweight bracket defining a counterweight bracket opening extending therethrough.

7. The modular battery system of claim 6, wherein the battery assembly includes a battery bracket defining a battery bracket opening extending therethrough.

8. The modular battery system of claim 7, wherein a retention pin is configured to be inserted through the counterweight bracket opening and the battery bracket opening to secure the battery assembly to the counterweight assembly.

9. The modular battery system of claim 1, wherein each of the pair of channels includes at least one spacer attached to a laterally-outer surface thereof, and wherein each of the at least one spacers is configured to add additional counterweight to the battery assembly.

10. The modular battery system of claim 1, wherein the battery assembly includes a plurality of battery assembly openings arranged in a predefined pattern, and wherein each of the pair of channels include a plurality of channel openings arranged to conform to at least a portion of the predefined pattern defined by the plurality of battery assembly openings.

11. A modular battery system for a material handling vehicle, the modular battery system comprising:
a counterweight assembly;
a battery assembly enclosing a power source and including a battery base; and
a pair of channels removably coupled to the battery base and each including at least one spacer attached to a laterally-outer surface thereof, wherein the battery assembly is configured to be slidably installed onto the counterweight assembly, and wherein each of the at least one spacers is configured to add additional counterweight to the battery assembly.

12. The modular battery system of claim 11, wherein the pair of channels are laterally separated from one another to define a counterweight slot therebetween.

13. The modular battery system of claim 12, wherein the battery assembly is configured to be slidably installed onto the counterweight assembly with the counterweight assembly received within the counterweight slot defined between the pair of channels.

14. The modular battery system of claim 11, wherein the battery assembly includes a plurality of battery assembly openings arranged in a predefined pattern, and wherein each of the pair of channels include a plurality of channel openings arranged to conform to at least a portion of the predefined pattern defined by the plurality of battery assembly openings.

15. The modular battery system of claim 11, further comprising at least one roller bearing coupled to the counterweight assembly and configured to provide a rolling interface between the pair of channels and the counterweight assembly.

16. The modular battery system of claim 11, wherein the counterweight assembly includes a central block protruding from a central base, and wherein the central block defines a first lateral surface and a second lateral surface.

17. The modular battery system of claim 16, wherein the each of the first lateral surface and the second lateral surface includes at least two roller bearings that are longitudinally separated from one another.

18. The modular battery system of claim 17, wherein each of the first lateral surface and the second lateral surface includes a first bearing spacer arranged longitudinally between the at least two roller bearings and a second bearing spacer arranged adjacent to a back side of the counterweight assembly.

19. The modular battery system of claim 11, wherein the counterweight assembly includes at least one counterweight bracket defining a counterweight bracket opening extending therethrough, and wherein the battery assembly includes a battery bracket defining a battery bracket opening extending therethrough.

20. The modular battery system of claim 19, wherein a retention pin is configured to be inserted through the counterweight bracket opening and the battery bracket opening to secure the battery assembly to the counterweight assembly.

* * * * *